US012693543B2

(12) United States Patent
Yamamoto

(10) Patent No.: US 12,693,543 B2
(45) Date of Patent: Jul. 28, 2026

(54) INFORMATION PROCESSING APPARATUS FOR CONTROLLING DISPLAY OF GUI IN OPTICAL SEE-THROUGH TYPE HEAD MOUNTED DISPLAY APPARATUS

(71) Applicant: CANON KABUSHIKI KAISHA, Tokyo (JP)

(72) Inventor: Jun Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/042,473

(22) Filed: Jan. 31, 2025

(65) Prior Publication Data

US 2025/0180919 A1       Jun. 5, 2025

Related U.S. Application Data

(63) Continuation of application No. PCT/JP2023/021017, filed on Jun. 6, 2023.

(30) Foreign Application Priority Data

Sep. 2, 2022     (JP) ................................. 2022-140035

(51) Int. Cl.
G02B 27/01          (2006.01)
G06F 3/01           (2006.01)

(52) U.S. Cl.
CPC ......... G02B 27/0179 (2013.01); G06F 3/013 (2013.01)

(58) Field of Classification Search
CPC ........ G02B 27/0179; G02B 2027/0187; G02B 27/0093; G06F 3/013; G06F 3/01;
(Continued)

(56) References Cited

U.S. PATENT DOCUMENTS

| | | | | |
|---|---|---|---|---|
| 2011/0170067 | A1* | 7/2011 | Sato ........................ | A61B 5/398 |
| | | | | 345/157 |
| 2011/0242280 | A1* | 10/2011 | Mishima ................... | G06T 5/70 |
| | | | | 348/46 |

(Continued)

FOREIGN PATENT DOCUMENTS

| | | |
|---|---|---|
| JP | 2016018213 A | 2/2016 |
| JP | 2017157142 A | 9/2017 |

(Continued)

OTHER PUBLICATIONS

U.S. Patent Application Publication #1 and Foreign Patent Documents #1-3 and 5-6 were cited in the International Search Report dated Aug. 22, 2023, of International Application No. PCT/JP2023/021017, which is enclosed with an English translation.

*Primary Examiner* — Sahlu Okebato
(74) *Attorney, Agent, or Firm* — Cowan, Liebowitz & Latman, P.C.

(57)          ABSTRACT

An information processing apparatus according to the present invention is an information processing apparatus capable of being used with an optical see-through type head mounted display apparatus, the information processing apparatus including one or more processors and/or circuitry configured to execute first instruction processing of issuing, to a user, a first instruction to cause an operation body located at a position of a hand of the user to move forwards, first acquisition processing of acquiring first information on a depth position of the operation body in a state in which the user moves the operation body forwards in response to the first instruction, and determination processing of determining, on a basis of the first information, a depth position of a GUI displayed on the head mounted display apparatus and operated by the operation body.

20 Claims, 14 Drawing Sheets

(58) Field of Classification Search
CPC ...... G06F 3/011; G06F 3/017; G06F 3/04815;
G09G 5/00; G09G 5/36; G09G 5/38
See application file for complete search history.

(56) References Cited

U.S. PATENT DOCUMENTS

| | | | |
|---|---|---|---|
| 2011/0316778 A1 | 12/2011 | Chung | |
| 2016/0353093 A1* | 12/2016 | Lyon .................... | G02B 27/017 |
| 2017/0092004 A1* | 3/2017 | Nishizawa ............ | G06T 19/006 |
| 2022/0129066 A1* | 4/2022 | Zahnert .................. | G06F 3/011 |

FOREIGN PATENT DOCUMENTS

| | | | |
|---|---|---|---|
| JP | 2017538218 A | 12/2017 | |
| JP | 2019162251 A | 9/2019 | |
| JP | 2020081170 A | 6/2020 | |
| JP | 2020190852 A | 11/2020 | |
| WO | 2014128747 A1 | 8/2014 | |

* cited by examiner

Y-AXIS DIRECTION

X-AXIS DIRECTION

Z-AXIS DIRECTION

LEFT EYE     RIGHT EYE

Y-AXIS DIRECTION

X-AXIS DIRECTION

Z-AXIS DIRECTION

*FIG. 5*

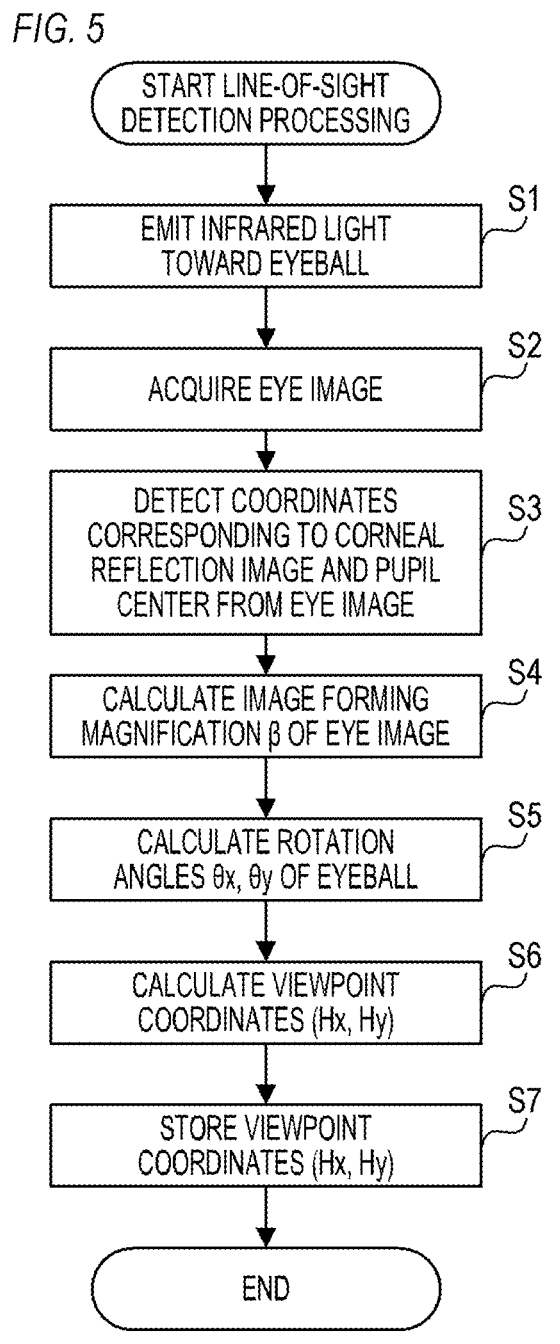

```
    ┌──────────────────────────┐
    │  START LINE-OF-SIGHT      │
    │  DETECTION PROCESSING     │
    └──────────────────────────┘
                 │
                 ▼
    ┌──────────────────────────┐  S1
    │   EMIT INFRARED LIGHT     │
    │     TOWARD EYEBALL        │
    └──────────────────────────┘
                 │
                 ▼
    ┌──────────────────────────┐  S2
    │     ACQUIRE EYE IMAGE     │
    └──────────────────────────┘
                 │
                 ▼
    ┌──────────────────────────┐  S3
    │   DETECT COORDINATES      │
    │ CORRESPONDING TO CORNEAL  │
    │ REFLECTION IMAGE AND PUPIL│
    │  CENTER FROM EYE IMAGE    │
    └──────────────────────────┘
                 │
                 ▼
    ┌──────────────────────────┐  S4
    │  CALCULATE IMAGE FORMING  │
    │ MAGNIFICATION β OF EYE IMAGE │
    └──────────────────────────┘
                 │
                 ▼
    ┌──────────────────────────┐  S5
    │    CALCULATE ROTATION     │
    │  ANGLES θx, θy OF EYEBALL │
    └──────────────────────────┘
                 │
                 ▼
    ┌──────────────────────────┐  S6
    │   CALCULATE VIEWPOINT     │
    │   COORDINATES (Hx, Hy)    │
    └──────────────────────────┘
                 │
                 ▼
    ┌──────────────────────────┐  S7
    │    STORE VIEWPOINT        │
    │   COORDINATES (Hx, Hy)    │
    └──────────────────────────┘
                 │
                 ▼
    ┌──────────────────────────┐
    │          END             │
    └──────────────────────────┘
```

*FIG. 7*

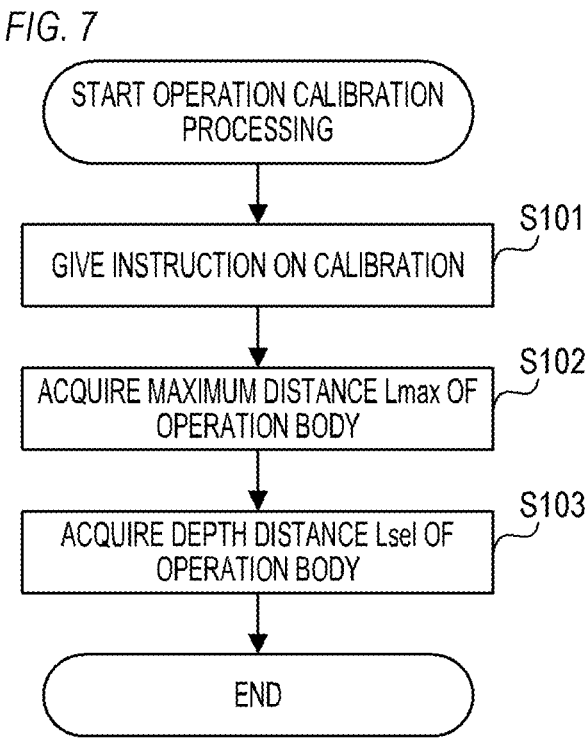

```
START OPERATION CALIBRATION
        PROCESSING
            │
            ▼
GIVE INSTRUCTION ON CALIBRATION        S101
            │
            ▼
ACQUIRE MAXIMUM DISTANCE Lmax OF       S102
        OPERATION BODY
            │
            ▼
ACQUIRE DEPTH DISTANCE Lsel OF         S103
        OPERATION BODY
            │
            ▼
           END
```

*FIG. 8*

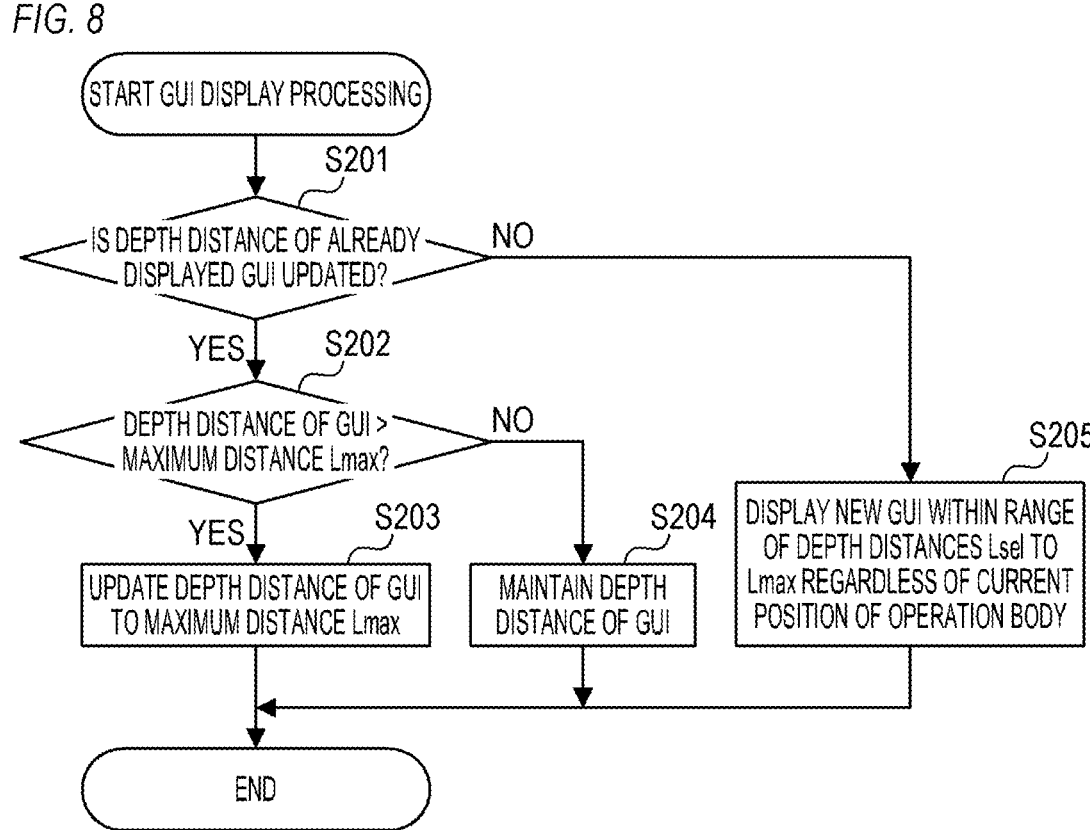

```
START GUI DISPLAY PROCESSING
            │
            ▼ S201
IS DEPTH DISTANCE OF ALREADY ──── NO ──────────────────────┐
DISPLAYED GUI UPDATED?                                      │
            │ YES                                           │
            ▼ S202                                          │
DEPTH DISTANCE OF GUI > ──── NO ─────────┐                  │
MAXIMUM DISTANCE Lmax?                   │                  │
            │ YES                        │          S205    │
            ▼ S203                       ▼ S204    DISPLAY NEW GUI WITHIN RANGE
UPDATE DEPTH DISTANCE OF GUI    MAINTAIN DEPTH     OF DEPTH DISTANCES Lsel TO
TO MAXIMUM DISTANCE Lmax       DISTANCE OF GUI     Lmax REGARDLESS OF CURRENT
            │                        │             POSITION OF OPERATION BODY
            ▼                        │                      │
            ◄────────────────────────┴──────────────────────┘
            │
            ▼
           END
```

DEPTH DIRECTION

INDEX FINGER

DETERMINE DEPTH DISTANCE Z(n) OF GUI SO THAT DIFFERENCE BETWEEN CONVERGENCE ANGLES A AND B BECOMES EQUAL TO OR LESS THAN THRESHOLD VALUE

OPERATION BODY

CONVERGENCE ANGLE A

GUI

CONVERGENCE ANGLE B

GUI

OPERATION BODY

DEPTH DIRECTION

DISTANCE UP TO OPERATION BODY IS EQUAL TO DISTANCE UP TO GUI

*FIG. 15A*

START AUTOMATIC PARAMETER
UPDATE PROCESSING

S801

IS PARAMETER UPDATED
AT PREDETERMINED CYCLE?    NO

YES    S802

IS IT UPDATE TIMING OF
PREDETERMINED CYCLE?    NO

YES

S803

DETERMINE GAZE

NOT GAZE    GUI    OPERATION BODY

S804
ACQUIRE DEPTH DISTANCE L(n) OF
OPERATION BODY

S807
ACQUIRE DEPTH DISTANCE
Z(n) OF GUI

S805
ACQUIRE CONVERGENCE ANGLE C(n)

S808
ACQUIRE CONVERGENCE
ANGLE C(n)

S806
ACQUIRE L-C RELATIONAL EXPRESSION

S809
ACQUIRE Z-C RELATIONAL
EXPRESSION

S810
ACQUIRE L-Z RELATIONAL EXPRESSION

END

*FIG. 15B*

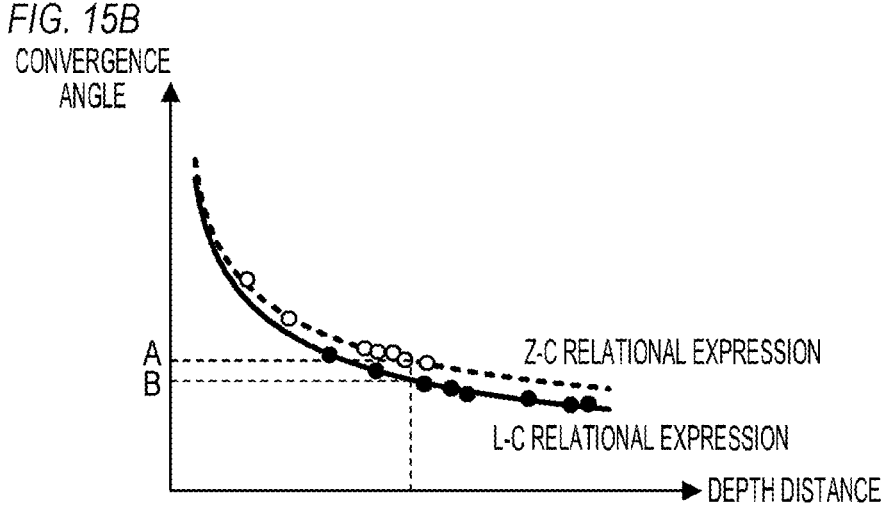

CONVERGENCE
ANGLE

A

B

Z-C RELATIONAL EXPRESSION

L-C RELATIONAL EXPRESSION

DEPTH DISTANCE

INFORMATION PROCESSING APPARATUS FOR CONTROLLING DISPLAY OF GUI IN OPTICAL SEE-THROUGH TYPE HEAD MOUNTED DISPLAY APPARATUS

CROSS-REFERENCE TO RELATED APPLICATIONS

This application is a Continuation of International Patent Application No. PCT/JP2023/021017, filed Jun. 6, 2023, which claims the benefit of Japanese Patent Application No. 2022-140035, filed Sep. 2, 2022, all of which are hereby incorporated by reference herein in their entirety.

BACKGROUND OF THE INVENTION

Field of the Invention

The present invention relates to an information processing apparatus, and particularly relates to a technique for displaying a graphical user interface (GUI) on an optical see-through type head mounted display apparatus.

Background Art

As a method of a head mounted display apparatus having a line-of-sight detection function, for example, a spectacle type device using mixed reality (MR) or augmented reality (AR), there is an optical see-through type. A user wearing an optical see-through type head mounted display apparatus can see the outside world (real space) or a graphic (for example, a virtual object) displayed by the head mounted display apparatus through an optical member (lens). In a case where a GUI (for example, a button or an icon) is displayed by the head mounted display apparatus, the user can give various instructions to an electronic device by operating the GUI. The electronic device is, for example, a head mounted display apparatus or an external device connected to the head mounted display apparatus.

PTL 1 discloses an optical see-through type head mounted display apparatus that displays a launcher-type GUI. PTL 1 also discloses that a user operates a GUI displayed by the head mounted display apparatus by a hand gesture (a gesture using the hand or the finger).

PTL 2 discloses that a GUI is displayed at a position of one hand of a user, and the GUI is operated with the other hand of the user.

However, in the related art, the GUI may not be displayed at a suitable depth position by the optical see-through type head mounted display apparatus. For example, the GUI may be displayed at a depth position where an operation body (for example, the hand or the finger of the user) for operating the GUI cannot reach. In a case where the technique disclosed in PTL 2 is used, the GUI is displayed at the position of the hand of the user, but in a case where the user can use only one hand (for example, in a case where a load is held in the other hand of the user), the GUI may not be displayed at a suitable depth position. In addition, when the technique disclosed in PTL 2 is used, operation with both hands cannot be performed.

The present invention provides a technique for displaying a GUI at a suitable depth position by an optical see-through type head mounted display apparatus (even if a user can use only one hand).

CITATION LIST

Patent Literature

PTL 1 JP 2017-538218 A
PTL 2 JP 2020-190852 A

SUMMARY OF THE INVENTION

The present invention in its first aspect provides an information processing apparatus capable of being used with an optical see-through type head mounted display apparatus, the information processing apparatus including one or more processors and/or circuitry configured to execute first instruction processing of issuing, to a user, a first instruction to cause an operation body located at a position of a hand of the user to move forwards, first acquisition processing of acquiring first information on a depth position of the operation body in a state in which the user moves the operation body forwards in response to the first instruction, and determination processing of determining, on a basis of the first information, a depth position of a GUI displayed on the head mounted display apparatus and operated by the operation body.

The present invention in its second aspect provides an information processing apparatus capable of being used with an optical see-through type head mounted display apparatus, the information processing apparatus including one or more processors and/or circuitry configured to execute first acquisition processing of repeatedly acquiring first information on a depth position of an operation body located at a position of a hand of a user, first determination processing of determining, on a basis of a plurality of pieces of the first information up to latest first information, a parameter for determining a depth position of a GUI displayed on the head mounted display apparatus and operated by the operation body, and second determination processing of determining the depth position of the GUI on a basis of the parameter.

The present invention in its third aspect provides an optical see-through type head mounted display apparatus including the above-described information processing apparatus, and a display configured to display the GUI.

The present invention in its fourth aspect provides a control method of an information processing apparatus capable of being used with an optical see-through type head mounted display apparatus, the control method comprising issuing, to a user, a first instruction to cause an operation body located at a position of a hand of the user to move forwards, acquiring first information on a depth position of the operation body in a state in which the user moves the operation body forwards in response to the first instruction, and determining, on a basis of the first information, a depth position of a GUI displayed on the head mounted display apparatus and operated by the operation body.

The present invention in its fifth aspect provides a non-transitory computer readable medium that stores a program, wherein the program causes a computer to execute a control method of an information processing apparatus capable of being used with an optical see-through type head mounted display apparatus, the control method comprising issuing, to a user, a first instruction to cause an operation body located at a position of a hand of the user to move forwards, acquiring first information on a depth position of the operation body in a state in which the user moves the operation body forwards in response to the first instruction, and determining, on a basis of the first information, a depth position of a GUI displayed on the head mounted display apparatus and operated by the operation body.

Further features of the present invention will become apparent from the following description of exemplary embodiments with reference to the attached drawings.

BRIEF DESCRIPTION OF THE DRAWINGS

FIG. 5 is a flowchart of line-of-sight detection processing;

FIG. 7 is a flowchart of operation calibration processing according to the first embodiment;

FIG. 8 is a flowchart of GUI display processing according to the first embodiment;

FIG. 15A is a flowchart of automatic parameter update processing according to a fourth embodiment; and FIG. 15B is a diagram illustrating a relationship between a depth distance and a convergence angle.

DESCRIPTION OF THE EMBODIMENTS

First Embodiment

A first embodiment of the present invention will be described. In a first embodiment, an example in which the present invention is applied to an optical see-through type head mounted display apparatus (HMD, head mounted display) will be described. The optical see-through type head mounted display apparatus is, for example, a smart glass (augmented reality (AR) glass). The optical see-through type head mounted display apparatus has, for example, a lens (optical member) similar to a lens of general eyeglasses, and projects a graphic (for example, a virtual object) onto the lens or the retina of a user. A user wearing the optical see-through type head mounted display apparatus can see the outside world (real space) or a graphic projected (displayed) by the head mounted display apparatus through the optical member (lens).

It is noted that the present invention is applicable to any information processing apparatus capable of being used together with the optical see-through type head mounted display apparatus, and the information processing apparatus may be provided in the head mounted display apparatus or may be provided in an electronic device separate from the head mounted display apparatus. For example, the present invention is also applicable to a controller or a personal computer (PC) connected to the optical see-through type head mounted display apparatus.

<Description of Configuration>

Figure 1A:
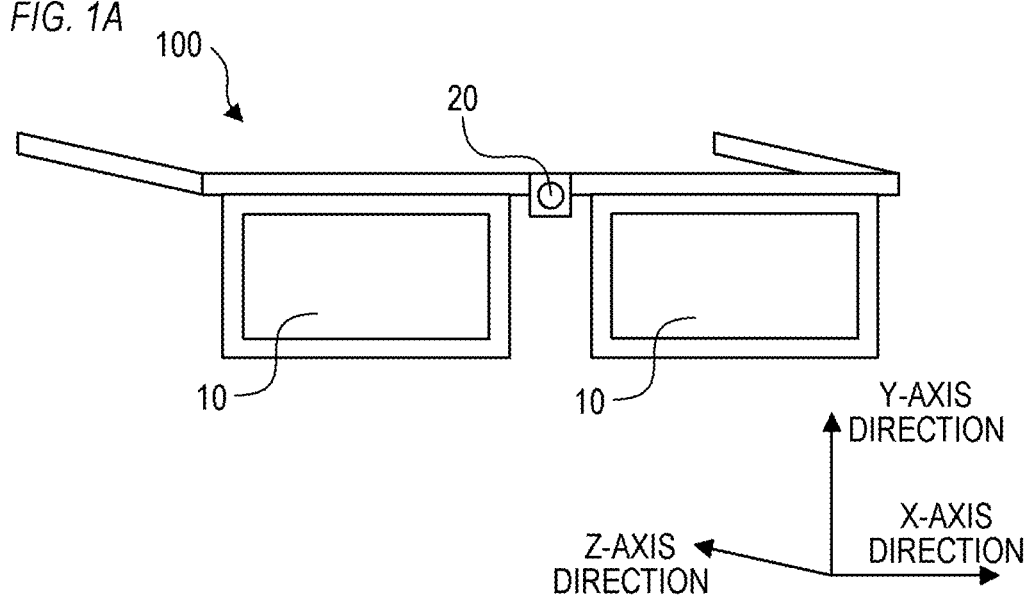
FIGS. 1A and 1B are external views of a display apparatus.
Figure 1B:
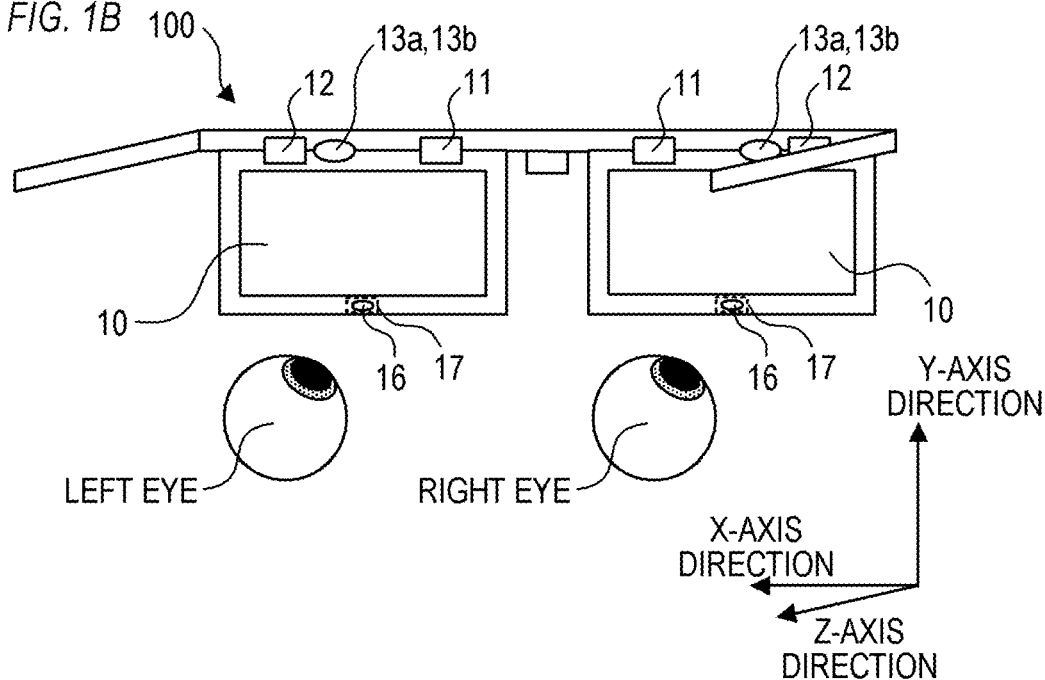

FIGS. 1A and 1B illustrate an appearance of a display apparatus 100 according to the first embodiment. FIG. 1A is a front perspective view, and FIG. 1B is a rear perspective view. The display apparatus 100 is an optical see-through type head mounted display apparatus. The display apparatus 100 can individually detect a line of sight of the right eye and a line of sight of the left eye of a user wearing the display apparatus 100 on the head. Hereinafter, the user wearing the display apparatus 100 on the head is simply referred to as a user.

The lens 10 is an optical member facing (directly facing) the eye of the user. The user can visually recognize the outside world through the lens 10. A display device 11 displays graphics (for example, a virtual image of a virtual object) for both eyes (both right eye and left eye) of the user under control (display control) from a CPU 2 to be described later. For example, the lens 10 has a prism or a half mirror, and the display device 11 projects a graphic onto the lens 10. The display device 11 may project the graphic onto the retina of the user. The lens 10 may be a transmissive type display having a display function (function of the display device 11). The display device 11 displays, for example, a graphical user interface (GUI, for example, buttons or icons) as a graphic. The user can view the displayed virtual object as if it exists in the outside world. When the graphic is displayed, a depth position (position in the depth direction (direction away from the user)) of the graphic viewed from the user can be adjusted by adjusting a positional relationship (parallax) in the left-to-right direction between a display position with respect to the right eye and a display position with respect to the left eye.

A light source drive circuit 12 drives light sources 13a and 13b. Each of the light source 13a and the light source 13b is a light source that illuminates the eyes of the user, and is, for example, an infrared light-emitting diode that emits infrared light insensitive to the user. A part of the light emitted from the light sources 13a and 13b and reflected by the user's eye is condensed on an eye imaging element 17 by a light-receiving lens 16. The eye imaging element 17 is an imaging sensor (imaging element) that images the eye of the user. The imaging sensor is, for example, a charge coupled device (CCD) sensor or a complementary metal oxide semiconductor (CMOS) sensor.

The lens 10, the display device 11, the light source drive circuit 12, the light sources 13a and 13b, the light-receiving lens 16, and the eye imaging element 17 are provided for each of the right eye and the left eye. Line-of-sight information of the user can be acquired using the light source drive circuit 12, the light sources 13a and 13b, the light-receiving lens 16, and the eye imaging element 17. The line-of-sight information is information related to a line of sight, and indicates, for example, at least one of a viewpoint, a line-of-sight direction (a direction of a line of sight), and a convergence angle (an angle formed by a line of sight of the right eye and a line of sight of the left eye). The viewpoint can also be regarded as a position at which a line of sight is focused, a position at which the user is viewing, or a line-of-sight position. Details of a method of acquiring the line-of-sight information will be described later.

An outside world imaging unit 20 includes an imaging sensor (imaging element) that images an external scene in a direction in which the user faces. Furthermore, the outside world imaging unit 20 has various functions of acquiring outside world information (information regarding the outside world). The imaging sensor is, for example, a CCD sensor or a CMOS sensor.

For example, the outside world imaging unit 20 has a function of detecting and tracking an operation body (for example, the user's hand, the user's finger, or an indicator rod held by the user's hand) that operates a GUI, and detecting a specific motion (gesture) of the operation body. The operation body is detected, for example, from an image obtained by imaging the outside world. Various known techniques (for example, hand tracking techniques) may be used for this function. For example, by associating a motion such as tapping a button serving as a GUI using the user's finger with processing assuming pressing of the button, a gesture operation (an operation by gesture) on the button becomes possible.

Furthermore, the outside world imaging unit 20 has a function of detecting a distance from the display apparatus 100 (user) to a real object existing in the outside world (a function of acquiring information regarding the distance (distance information)). Various known techniques may be used for this function. For example, a method of measuring a time from when a light wave (for example, laser light or light-emitting diode (LED) light) is emitted toward an object until the light wave is reflected by the object and returns may be used. Instead of the light wave, a sound wave or a radio wave may be used. A distance measuring sensor (for example, a light detection and ranging (LiDAR) sensor using laser light, or a time of flight (TOF) sensor using LED light) different from the above-described imaging sensor may be used. A method of calculating a distance from an image obtained by imaging the outside world may be used. For example, a stereo camera that performs distance measurement using two imaging sensors may be used. A method of performing distance measurement using a plurality of different pixels (a plurality of photoelectric conversion elements) in the imaging plane of the imaging sensor (phase difference AF (AutoFocus)) may be used.

A single photon avalanche diode (SPAD) sensor, which is a type of TOF sensor, can perform distance measurement at high speed and with high sensitivity. For example, in real-time distance measurement up to several meters ahead, a distance detection error is less than several %. By using the phase difference AF, distance measurement of a real object and detection of an operation body can be performed using the same imaging sensor, so that the number of sensors can be reduced and costs can be reduced. In the first embodiment, the phase difference AF is used.

It is noted that there is a correlation between a distance to a real object and a convergence angle of a user when viewing the real object, and these can be detected with high accuracy within a range of about 1 m from the display apparatus 100 (user).

Figure 2:
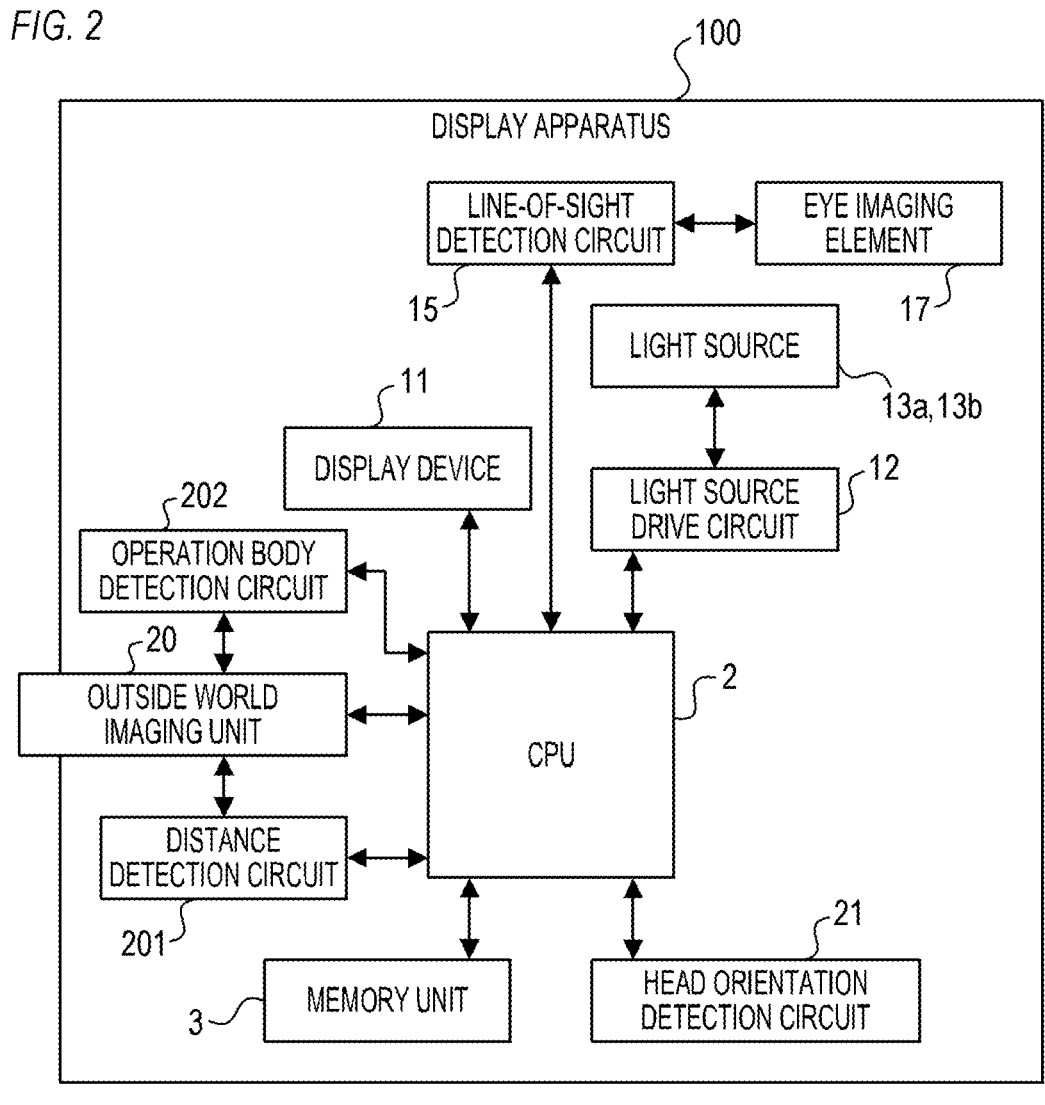
FIG. 2 is a block diagram of the display apparatus.

FIG. 2 is a block diagram illustrating an electrical configuration of the display apparatus 100. The CPU 2 is a central processing unit of a microcomputer incorporated in the display apparatus 100, and controls the display apparatus 100 overall. The display device 11, the light source drive circuit 12, a line-of-sight detection circuit 15, the outside world imaging unit 20, a distance detection circuit 201, an operation body detection circuit 202, a head orientation detection circuit 21, and a memory unit 3 are connected to the CPU 2.

The memory unit 3 has a storage function of a video signal from the eye imaging element 17 and a storage function of a line-of-sight correction parameter (parameter for correcting an individual difference in a line of sight) to be described later.

The line-of-sight detection circuit 15 performs A/D conversion on the output of the eye imaging element 17 (eye image obtained by imaging the eye) in a state in which the optical image of the eye is formed on the eye imaging element 17, and transmits the result to the CPU 2. The CPU 2 extracts a characteristic point necessary for line-of-sight detection from the eye image according to a predetermined algorithm to be described later, and detects the line of sight of the user from the position of the characteristic point.

The distance detection circuit 201 performs A/D conversion on signals (voltages) from a plurality of pixels (a plurality of photoelectric conversion elements) for phase difference detection included in an imaging sensor in the outside world imaging unit 20, and transmits the converted signals to the CPU 2. The CPU 2 calculates a distance to a real object (imaging target) corresponding to each distance detection point using the signals of the plurality of pixels.

The operation body detection circuit 202 detects the operation body from the image (image obtained by imaging the outside world) obtained by the outside world imaging unit 20, and transmits a detection result (position or motion of the operation body) to the CPU 2. The CPU 2 determines whether there is a specific motion (gesture) of the operation body on the basis of the detection result of the operation body. Then, in a case where it is determined that there is a specific motion of the operation body, the CPU 2 performs processing associated with the specific motion.

The head orientation detection circuit 21 includes, for example, an acceleration sensor, and transmits a detection signal (output signal) of the acceleration sensor to the CPU 2. The CPU 2 analyzes the detection signal and detects an orientation (for example, inclination amount) of the user's head. A change in orientation of the head can be regarded as a change in the viewing direction (direction in which the user faces) in a coordinate system of the real space (world coordinate system). The CPU 2 can change the display position of the GUI in synchronization with the change in the view direction on the basis of the detection result of the orientation of the head.

<Description of Line-of-Sight Detection Processing>

Figure 3:
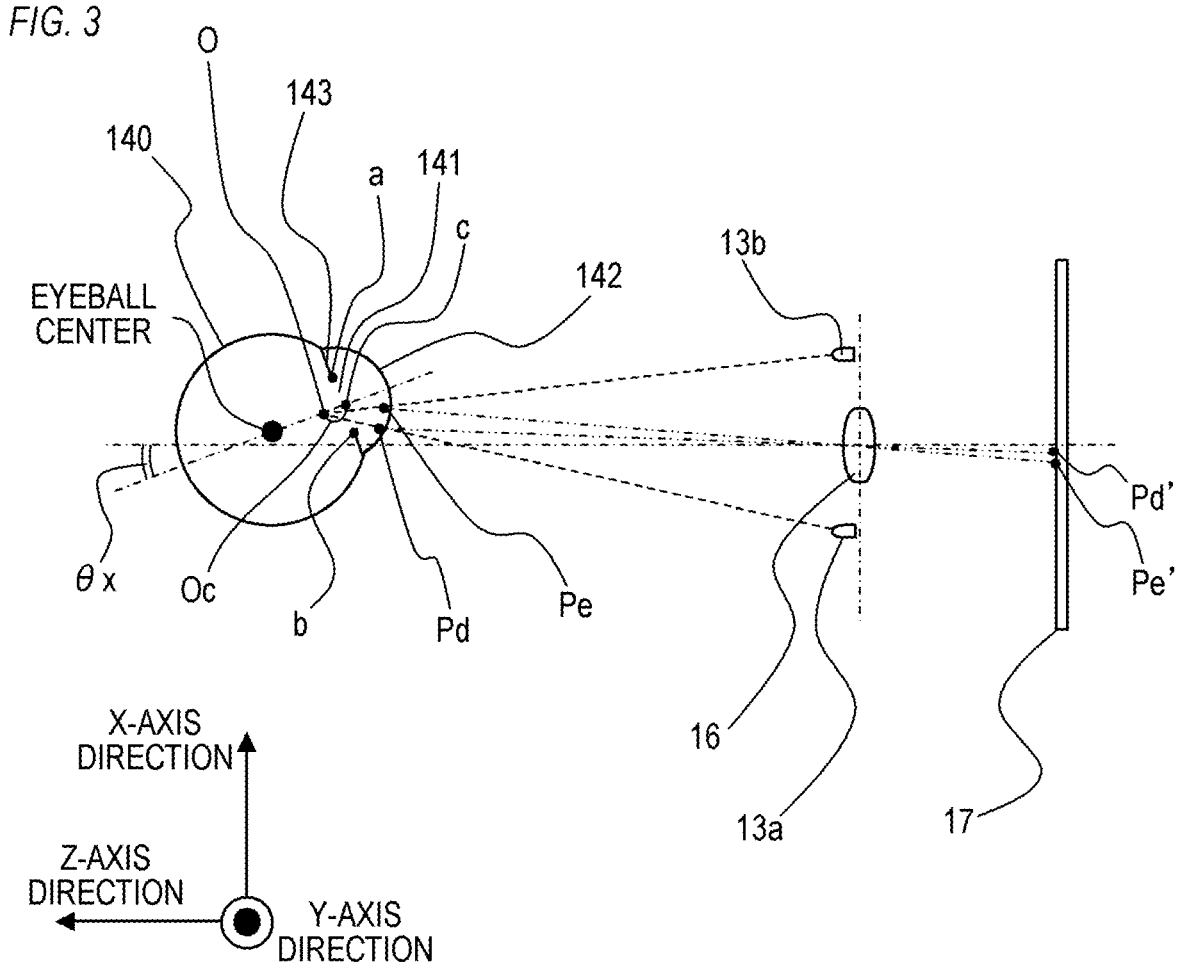
FIG. 3 is a diagram illustrating a principle of a line-of-sight detection method.
Figure 4A:
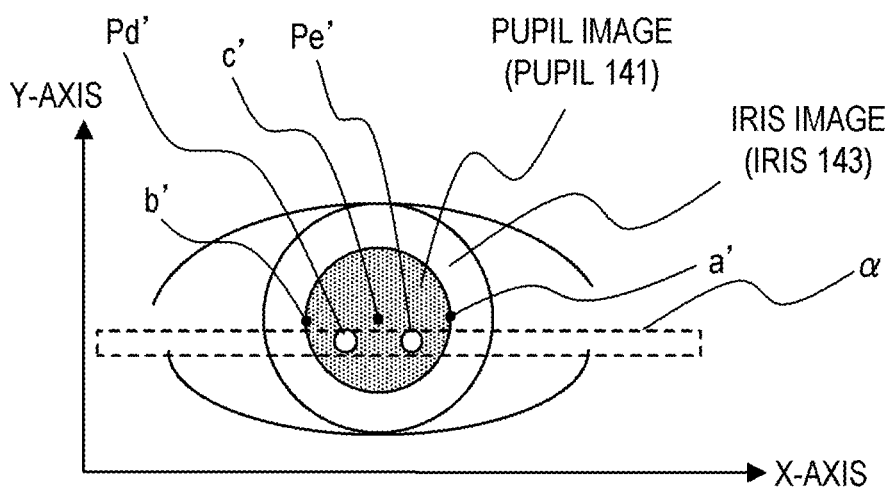
FIG. 4A is a diagram illustrating an eye image.
Figure 4B:
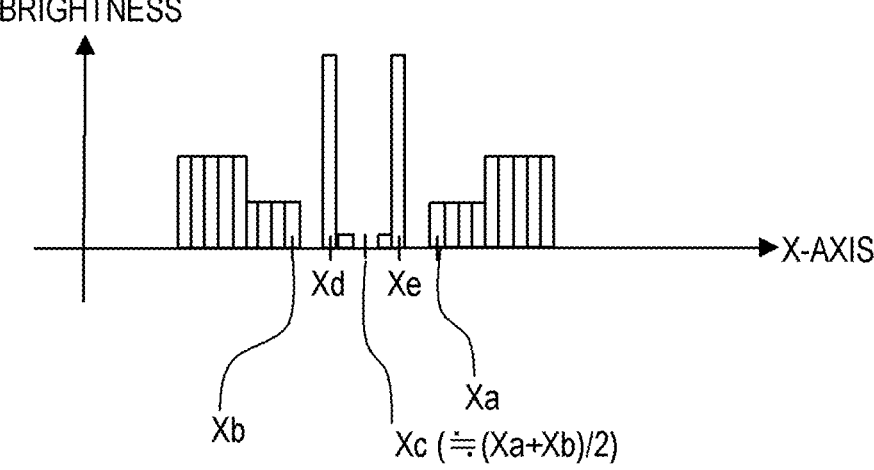
FIG. 4B is a diagram illustrating a brightness distribution of the eye image.

Line-of-sight detection processing (line-of-sight detection method) will be described with reference to FIGS. 3, 4A, 4B, and 5. Both the line of sight of the right eye and the line of sight of the left eye are detected by the following line-of-sight detection method. FIG. 3 is a diagram illustrating a principle of the line-of-sight detection method, and is a schematic diagram of an optical system for detecting a line of sight. As illustrated in FIG. 3, the light sources 13a and 13b are arranged substantially symmetrically with respect to the optical axis of the light-receiving lens 16, and illuminate an eyeball 140 of the user. A part of the light emitted from the light sources 13a and 13b and reflected by the eyeball 140 is condensed on the eye imaging element 17 by the light-receiving lens 16. FIG. 4A is a schematic diagram of an eye image (an optical image of an eye projected on the eye imaging element 17) captured by the eye imaging element 17, and FIG. 4B is a diagram illustrating output intensity of the eye imaging element 17. FIG. 5 is a flowchart of the line-of-sight detection processing.

When the line-of-sight detection processing in FIG. 5 starts, in step S1, the CPU 2 controls the light sources 13a and 13b using the light source drive circuit 12 so as to emit infrared light toward the eyeball 140 of the user. An optical image of the user's eye illuminated by the infrared light is formed on the eye imaging element 17 through the light-receiving lens 16, and is photoelectrically converted by the eye imaging element 17. Thereby, an electrical signal of the processable eye image is obtained.

In step S2, the CPU 2 acquires an eye image (image data and image signal) from the eye imaging element 17 via the line-of-sight detection circuit 15.

In step S3, the CPU 2 detects coordinates of points corresponding to corneal reflection images Pd and Pe of the light sources 13a and 13b and a pupil center c from the eye image obtained in step S2.

The infrared light emitted from the light sources 13a and 13b illuminates a cornea 142 of the eyeball 140 of the user. At this time, the corneal reflection images Pd and Pe formed by a part of the infrared light reflected by the surface of the cornea 142 are condensed by the light-receiving lens 16 and are formed on the eye imaging element 17, thereby forming corneal reflection images Pd' and Pe' in the eye image. Similarly, light fluxes from ends a and b of a pupil 141 are also imaged on the eye imaging element 17, thereby forming pupil end images a' and b' in the eye image.

FIG. 4B illustrates brightness information (brightness distribution) of a region a in the eye image illustrated in FIG. 4A. FIG. 4B illustrates a brightness distribution in the X-axis direction. Here, the horizontal direction of the eye image is defined as the X-axis direction, and the vertical direction is defined as the Y-axis direction. In the first embodiment, coordinates of the corneal reflection images Pd' and Pe' in the X-axis direction (horizontal direction) are defined as Xd and Xe, and coordinates of the pupil end images a' and b' in the X-axis direction are defined as Xa and Xb. As illustrated in FIG. 4B, an extremely high level of brightness is obtained at the coordinates Xd and Xe of the corneal reflection images Pd' and Pe'. In a region from the coordinate Xa to the coordinate Xb, which corresponds to a region of the pupil 141 (a region of a pupil image obtained by forming the light flux from the pupil 141 on the eye imaging element 17), extremely low level brightness is obtained except for the coordinates Xd and Xe. Then, in a region of an iris 143 outside the pupil 141 (a region of an iris image outside a pupil image obtained by imaging the light flux from the iris 143), intermediate brightness between the above two types of brightness is obtained. For example, in a region where the X coordinate (coordinate in the X-axis direction) is larger than the coordinate Xa and a region where the X coordinate is smaller than the coordinate Xb, intermediate brightness between the two types of brightness is obtained.

The X coordinates Xd and Xe of the corneal reflection images Pd' and Pe' and the X coordinates Xa and Xb of the pupil end images a' and b' can be obtained from the brightness distribution, as illustrated in FIG. 4B. For example, coordinates with extremely high brightness can be obtained as coordinates of the corneal reflection images Pd' and Pe', and coordinates with extremely low brightness can be obtained as coordinates of the pupil end images a' and b'. Furthermore, in a case where a rotation angle θx of the optical axis of the eyeball 140 with respect to the optical axis of the light-receiving lens 16 is small, a coordinate Xc of a pupil center image c' (the center of the pupil image) obtained by forming the light flux from the pupil center c on the eye imaging element 17 can be expressed as Xc≈(Xa+Xb)/2.

That is, the coordinate Xc of the pupil center image c' can be calculated from the X coordinates Xa and Xb of the pupil end images a' and b'. In this manner, the coordinates of the corneal reflection images Pd' and Pe' and the coordinates of the pupil center image c' can be estimated.

In step S4, the CPU 2 calculates an image forming magnification β of the eye image. The image forming magnification β is a magnification determined by the position of the eyeball 140 with respect to the light-receiving lens 16, and can be calculated using a function of an interval (Xd−Xe) between the corneal reflection images Pd' and Pe'.

In step S5, the CPU 2 calculates the rotation angle of the optical axis of the eyeball 140 with respect to the optical axis of the light-receiving lens 16. An X coordinate of a midpoint between the corneal reflection image Pd and the corneal reflection image Pe substantially coincides with an X coordinate of a curvature center O of the cornea 142. Therefore, when a standard distance from the curvature center O of the cornea 142 to the center c of the pupil 141 is defined as Oc, the rotation angle θx of the eyeball 140 in the Z-X plane (plane perpendicular to the Y axis) can be calculated by the following Formula 1. A rotation angle θy of the eyeball 140 in the Z-Y plane (plane perpendicular to the X axis) can also be calculated by a method similar to the method of calculating the rotation angle θx.

$$\beta \times Oc \times \mathrm{SIN}\theta x \approx \left\{(Xd + Xe)/2\right\} - Xc \qquad \text{(Formula 1)}$$

In step S6, the CPU 2 estimates the viewpoint of the user on the lens 10 using the rotation angles θx and θy calculated in step S5. Assuming that coordinates (Hx, Hy) of the viewpoint are coordinates corresponding to the pupil center c, the coordinates (Hx, Hy) of the viewpoint can be calculated by the following Formulas 2 and 3.

$$Hx = m \times (Ax \times \theta x + Bx) \qquad \text{(Formula 2)}$$

$$Hy = m \times (Ay \times \theta y + By) \qquad \text{(Formula 3)}$$

A parameter m in Formulas 2 and 3 is a constant determined by a configuration of the optical system for performing the line-of-sight detection processing, and is a conversion coefficient for converting the rotation angles θx and θy into coordinates corresponding to the pupil center c on the lens 10. It is assumed that the parameter m is determined in advance and is stored in the memory unit 3. Parameters Ax, Bx, Ay, and By are line-of-sight correction parameters for correcting individual differences in the line of sight, and are acquired by performing calibration of the line-of-sight detection. It is assumed that the line-of-sight correction parameters Ax, Bx, Ay, and By are stored in the memory unit 3 before the line-of-sight detection processing starts.

In step S7, the CPU 2 stores the coordinates (Hx, Hy) of the viewpoint in the memory unit 3, and ends the line-of-sight detection processing.

It is noted that the line-of-sight detection method is not limited to the above-described method, and for example, any method may be used as long as the method is a method of acquiring the line-of-sight information from the eye image. The line of sight may be detected by a method not using an eye image, such as a method of detecting an eye potential and detecting a line of sight on the basis of the eye potential, without using the eye image. As the final line-of-sight information, information indicating a line-of-sight direction (line-of-sight direction) may be obtained instead of information indicating a viewpoint. For example, processing up to obtaining the rotation angle (Ax×θx+Bx or Ay×θy+By) may be performed without obtaining the coordinates (Hx, Hy) of the viewpoint.

<Description of Overall Processing>

Since there are individual differences in physical characteristics (for example, height, length of the arm, and hand size), the range of suitable depth positions of the GUI differs for each user. A suitable depth position of the GUI is, for example, a depth position at which a gesture operation for the GUI can be easily performed or a depth position at which a gesture operation for the GUI can be performed without discomfort. For example, a suitable range of the depth positions of the GUI is different between a user having a high height and long arms and a user having a low height and short arms. Therefore, when the GUI is displayed at a predetermined depth position, some users may feel that the GUI is too far or the GUI is too close. For example, when the GUI is displayed at a depth position suitable for a user having long arms, a user having short arms may feel that the GUI is too far away. Similarly, when the GUI is displayed at a depth position suitable for a user having short arms, a user having long arms may feel that the GUI is too close.

Therefore, in the first embodiment, the calibration of the gesture operation is performed. By performing the calibration of the gesture operation, the GUI is displayed at a depth position suitable for a current user in consideration of the physical characteristics of the current user.

Figure 6:
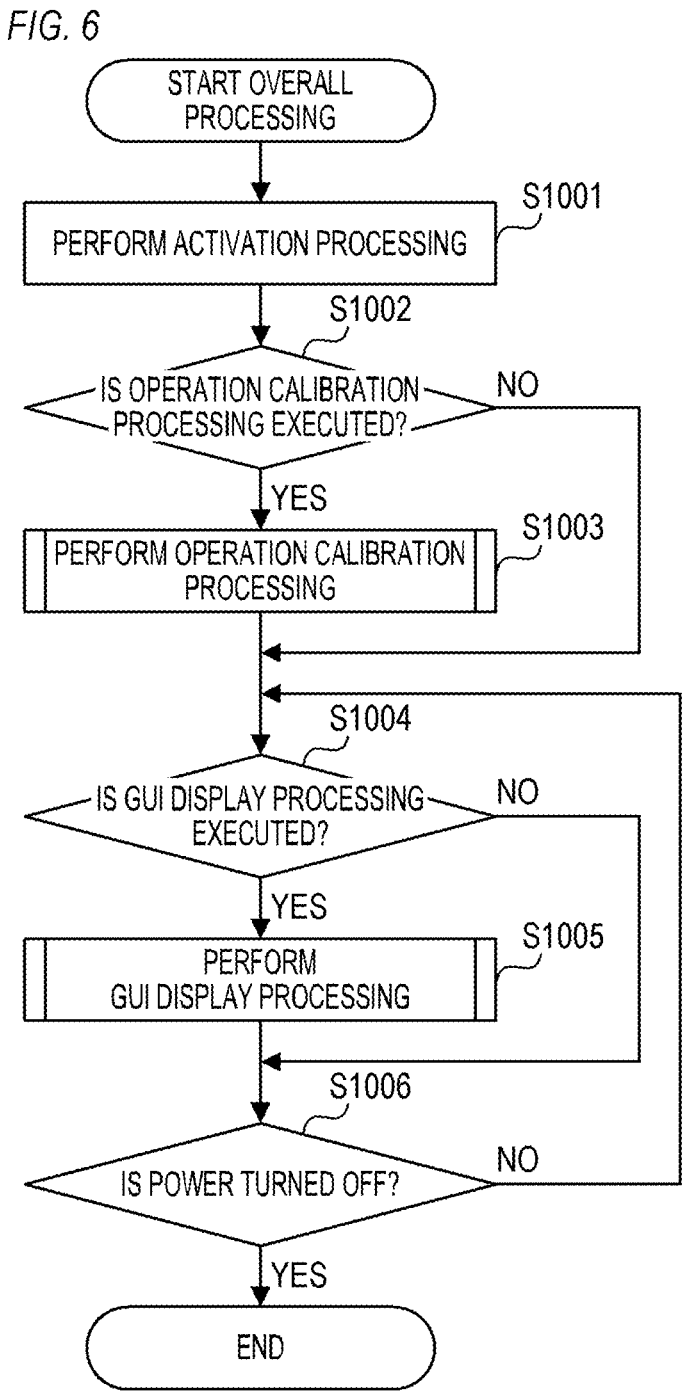
FIG. 6 is a flowchart of overall processing according to a first embodiment.

FIG. 6 is a flowchart of overall processing. For example, when a user wears the display apparatus 100 and activates the display apparatus 100, overall processing in FIG. 6 is started.

When the overall processing in FIG. 6 is started, the CPU 2 performs activation processing in step S1001. In the activation processing, for example, initial setting of various parameters is performed.

In step S1002, the CPU 2 determines whether to perform operation calibration processing (the calibration of the gesture operation). In a case where it is determined that the operation calibration processing is to be performed, the CPU 2 advances the processing to step S1003, and in a case where it is determined that the operation calibration processing is not to be performed, the CPU 2 advances the processing to step S1004. For example, in a case where the current user is specified by personal authentication and a processing result (result of the operation calibration processing) for the current user has already been stored in the memory unit 3, the CPU 2 determines not to perform the operation calibration processing. In this case, the processing result (the result of the operation calibration processing for the current user) stored in the memory unit 3 is used in step S1005. The CPU 2 may inquire of the user whether to perform the operation calibration processing. Whether to perform the operation calibration processing at the time of activation of the display apparatus 100 may be set in advance according to an instruction from the user.

In step S1003, the CPU 2 performs the operation calibration processing. In the first embodiment, the operation calibration processing in FIG. 7 is performed. In the operation calibration processing, information on the physical characteristics (for example, length of the arm) of the user is acquired as an index (parameter) for determining the depth position of the GUI.

When the operation calibration processing in FIG. 7 is started, in step S101, the CPU 2 instructs the user to perform calibration to move an operation body located at the position of the hand of the user forwards. The calibration instruction is realized by, for example, voice output or character display. A virtual object (index) for prompting forward motion of the operation body may be displayed. An instruction to cause a user to perform an operation can also be regarded as a notification to cause a user to perform an operation, an instruction to prompt a user to perform an operation, or a notification to prompt a user to perform an operation.

In step S102, the CPU 2 acquires a maximum distance Lmax from the display apparatus 100 (user) to the operation body using the outside world imaging unit 20, the distance detection circuit 201, and the operation body detection circuit 202. In a case where the operation body is the hand or the finger of the user, the maximum distance Lmax corresponds to the length of the arm of the user.

For example, a calibration instruction to (maximally) extend the arm of the user is issued. A virtual object (index) may be displayed at a depth position about 2 m away from the display apparatus 100 (user) (depth position at which the operation body does not reach), and a calibration instruction to extend the arm toward the virtual object may be issued. Then, a depth distance of the operation body is acquired as the maximum distance Lmax in a state in which the user puts the operation body forwards in response to the calibration instruction (in a state in which the user extends the arm). The depth distance of the operation body is a distance from the display apparatus 100 (user) to the operation body. In a case where the operation body is the hand or the finger of the user, the depth distance of the operation body may be a distance to the back of the hand of the user or a distance to an index finger extended by the user. The definition of the depth distance of the operation body (a portion to be measured) may be changed on the basis of the type of the operation body and the type of registered gesture (specific motion of the operation body).

In step S103, the CPU 2 uses the outside world imaging unit 20, the distance detection circuit 201, and the operation body detection circuit 202 so as to acquire a depth distance Lsel of the operation body at which the user can easily operate the GUI. The depth distance Lsel can also be regarded as a depth distance selected by the user.

For example, a calibration instruction to move the operation body to a depth position at which the GUI can be easily operated is issued. Assuming that the GUI is displayed, a calibration instruction to cause the user to perform a gesture of operating the GUI may be performed. A GUI whose position in a coordinate system of a real space (a world coordinate system) is fixed may be displayed, and a calibration instruction to move the user to a position at which the GUI is easy to operate and operating the GUI may be performed. A GUI whose depth position changes with time may be displayed, and a calibration instruction to operate the GUI at an easy timing may be performed. Then, the depth distance of the operation body is acquired as the depth distance Lsel at a timing when the user brings the operation body forwards in response to the calibration instruction and performs a gesture (for example, tapping) of operating the GUI.

Although the example in which both the depth distance (maximum distance) Lmax and the depth distance Lsel are acquired has been described, only one of the depth distance Lmax and the depth distance Lsel may be acquired. The user may select whether to acquire the depth distance Lmax, the depth distance Lsel, or the depth distances Lmax and Lsel. In order to more accurately grasp a suitable range of the depth position of the GUI, it is preferable to acquire both the depth distance Lmax and the depth distance Lsel.

The following description returns to FIG. 6. In step S1004, the CPU 2 determines whether there is an instruction to execute GUI display processing from the user. In a case where it is determined that there is the instruction to execute the GUI display processing, the CPU 2 advances the processing to step S1005, and in a case where it is determined that there is no instruction to execute the GUI display processing, the CPU 2 advances the processing to step S1006. In the GUI display processing, a new GUI is displayed, or the depth position (depth distance) of the already displayed GUI is updated. The depth distance of the GUI is a distance from the display apparatus 100 (user) to the GUI. An execution instruction to display a new GUI is realized, for example, by performing a specific operation on a specific operation panel, performing a specific gesture, or outputting a specific keyword by voice. The execution instruction to update the depth position (depth distance) of the already displayed GUI is realized, for example, by viewing the GUI for a predetermined time or performing a specific gesture on the GUI. The specific gesture may be a gesture of tapping with an index finger or a gesture of moving a finger to operate a keyboard. The execution instruction of the GUI display processing may be issued by appropriately combining the line of sight, the voice, and the gesture.

In step S1005, the CPU 2 performs GUI display processing. In the first embodiment, the GUI display processing in FIG. 8 is performed. In the GUI display processing, the depth position (depth distance) of the GUI is determined on the basis of the parameters (depth distances Lmax and Lsel) acquired by the operation calibration processing. For example, when the GUI is displayed with a depth distance longer than the depth distance (maximum distance) Lmax, the user may feel that the operation body does not reach the GUI and the GUI is too far. Therefore, it is preferable to determine a depth distance within a range of the depth distance Lsel or more and the depth distance Lmax or less or a depth distance in the vicinity of the range as the depth distance of the GUI.

When the GUI display processing in FIG. 8 starts, in step S201, the CPU 2 determines whether to update the depth distance of the GUI that has already been displayed. In a case where the CPU 2 determines to update the depth distance of the GUI that has already been displayed, the processing proceeds to step S202, and in a case where the CPU 2 determines not to update the depth distance (display a new GUI), the processing proceeds to step S205.

In step S202, the CPU 2 determines whether a current depth distance of the GUI is longer than the depth distance (maximum distance) Lmax. In a case where the CPU 2 determines that the current depth distance of the GUI is longer than the depth distance Lmax, the processing proceeds to step S203, and in a case where the CPU 2 determines that the current depth distance of the GUI is equal to or less than the depth distance Lmax, the processing proceeds to step S204.

In step S203, the CPU 2 updates the depth distance of the GUI to the depth distance (maximum distance) Lmax (or a depth distance in the vicinity thereof).

In step S204, the CPU 2 does not update the depth distance of the GUI. In a case where the current depth distance of the GUI is shorter than the depth distance Lsel, the CPU 2 may update the depth distance of the GUI to a depth distance within a range of the depth distance Lsel or more and the depth distance Lmax or less, or a depth distance in the vicinity of the range.

In step S205, regardless of the current position of the operation body, the CPU 2 displays a new GUI at a depth distance within a range of the depth distance Lsel or more and the depth distance (maximum distance) Lmax or less, or a depth distance in the vicinity of the range. Since a new GUI is displayed according to an instruction from the user, the new GUI is preferably displayed at the depth distance Lsel or a depth distance in the vicinity thereof. As described above, in the operation calibration processing, only one of the depth distance Lmax and the depth distance Lsel may be acquired. Then, in step S205, a new GUI may be displayed at the depth distance (the depth distance Lmax or the depth distance Lsel) acquired by the operation calibration processing or the depth distance in the vicinity thereof. The depth distance of the GUI may be selectable by the user.

According to the GUI display processing in FIG. 8, when the depth distances Lmax and Lsel change, the depth distance of the GUI also changes. The depth position of the GUI is different between a case in which the depth position of the operation body in a state in which the user puts the operation body forwards in response to the calibration instruction is a first position and a case in which the depth position of the operation body is a second position different from the first position.

The following description returns to FIG. 6. In step S1006, the CPU 2 determines whether the user has instructed the display apparatus 100 to turn off the power. The CPU 2 returns the processing to step S1004 in a case where it is determined that an instruction on the power OFF is not given, and ends overall processing in FIG. 6 and turns off the power of the display apparatus 100 in a case where it is determined that the instruction on the power OFF is given.

It is noted that, as described above, the result of the operation calibration processing (depth distances Lmax and Lsel) may be stored in the memory unit 3 and may be used again in subsequent GUI display processing. The processing result (the result of the operation calibration processing) stored in the memory unit 3 may be updated as appropriate.

<Summary>

As described above, according to the first embodiment, information on a depth position of an operation body in a state in which a user puts the operation body forwards is acquired in advance, and the depth position of the GUI is determined on the basis of the acquired information. In this manner, the GUI is displayed at a suitable depth position by the optical see-through type head mounted display apparatus (even if the user can use only one hand). As a result, operability of a gesture operation on the GUI can be improved.

Second Embodiment

A second embodiment of the present invention will be described. Hereinafter, the description of the same points as those of the first embodiment (for example, the same configuration and processing as those of the first embodiment) will be omitted, and points different from those of the first embodiment will be described.

In the first embodiment, an example in which the GUI is displayed with the depth distance (or the depth distance in the vicinity thereof) acquired by the operation calibration processing has been described. However, the GUI is displayed assuming a predetermined visual characteristic. For example, the position of the user in a virtual space of an orthogonal coordinate system, a polar coordinate system, or a cylindrical coordinate system is determined, and the position of the GUI is determined on the base of the position of the user. Then, parallax of the GUI is determined assuming that the user has a predetermined visual characteristic, and the GUI is displayed with the determined parallax. Since there are individual differences in visual characteristics (for example, structures of the eye (for example, retinal structures) and spacing between the two eyes), a sense of distance to the GUI (a sense of depth of the GUI) differs for each user. Therefore, some users may see the GUI at a depth distance different from the depth distance assumed by the display apparatus 100. Then, some users may feel inconsistency between a sense of distance to the operation body (sense of depth, depth distance, and depth position) and a sense of distance to the GUI displayed at a position assuming a position touched by the operation body. Such inconsistency may give the user a sense of discomfort of the gesture operation or an unpleasant feeling.

Therefore, in the second embodiment, the GUI is displayed at a more suitable depth position for the current user by further considering the visual characteristics of the current user in addition to the physical characteristics of the current user.

<Description of Operation Calibration Processing>

Figure 9:
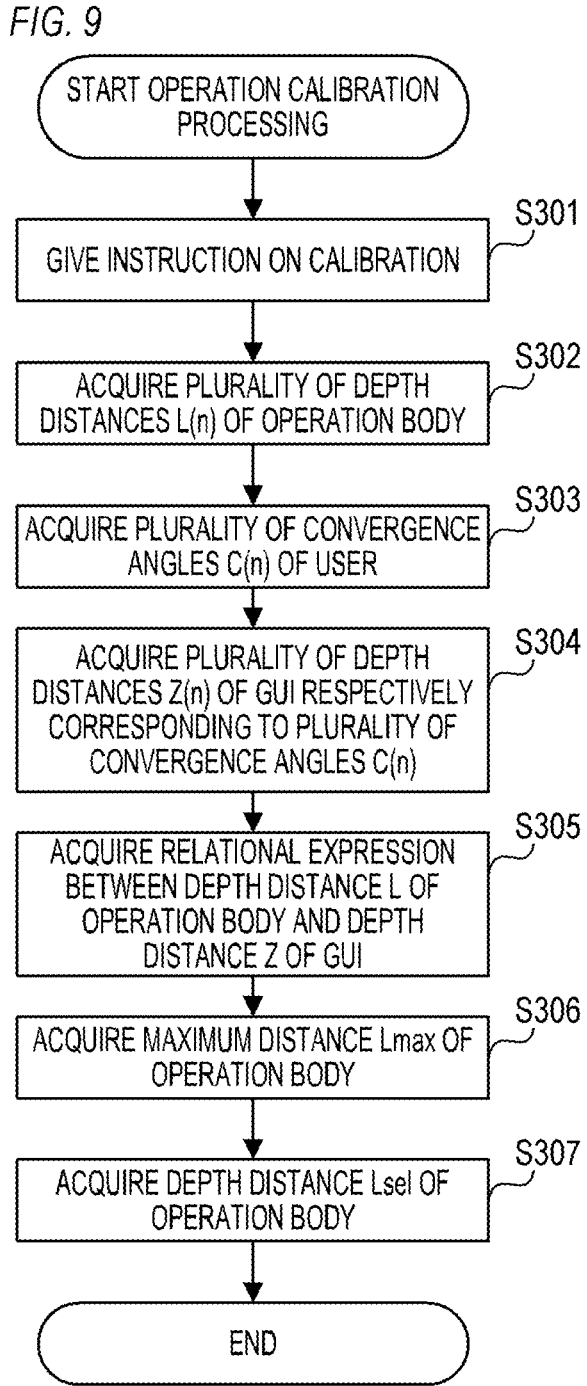
FIG. 9 is a flowchart of operation calibration processing according to a second embodiment.

FIG. 9 is a flowchart of the operation calibration processing according to the second embodiment. The overall processing of the second embodiment is similar to the overall processing of the first embodiment (FIG. 6), and the operation calibration processing in FIG. 9 is performed in step S1003 of FIG. 6. In the operation calibration processing in FIG. 9, in addition to the information on the physical characteristics of the user, information on the visual characteristics (for example, convergence angle) of the user is further acquired, and an index (parameter) for determining the depth position of the GUI is acquired on the basis of the information.

When the operation calibration processing in FIG. 9 is started, in step S301, the CPU 2 instructs the user to perform calibration to move the operation body forwards.

A calibration instruction may be an instruction to move the operation body in the depth direction. For example, the calibration instruction may be an instruction to cause the operation body to be moved forwards (to the maximum) and then slowly return the operation body right in front of the user. A GUI whose position in the coordinate system of the real space (world coordinate system) is fixed may be displayed, and a calibration instruction to operate the GUI at various distances from the GUI may be issued. A GUI whose depth position changes with time may be displayed, and a calibration instruction to operate the GUI at various distances from the GUI may be issued. A gesture for operating the GUI is, for example, a tap. In the second embodiment, the calibration instruction is an instruction to move the operation body in the depth direction.

In step S302, the CPU 2 acquires a plurality of depth distances L(n) of the operation body using the outside world imaging unit 20, the distance detection circuit 201, and the operation body detection circuit 202. n is a variable for distinguishing a plurality of depth distances of the operation body.

In step S303, the CPU 2 acquires a convergence angle of the user (a plurality of convergence angles C(n) respectively corresponding to the plurality of depth distances L(n)) in a state in which the user gazes at the operation body. The convergence angle of the user can be calculated from a rotation angle $\theta x$ (or $Ax \times \theta x + Bx$) of the right eye and a rotation angle $\theta x$ (or $Ax \times \theta x + Bx$) of the left eye. The rotation angles $\theta x$ and $Ax \times \theta x + Bx$ are rotation angles in the horizontal direction, and can be acquired by the line-of-sight detection processing in FIG. 5. An acquisition timing of the convergence angle C(n) is not particularly limited, but it is preferable to simultaneously acquire the depth distance L(n) and acquire the convergence angle C(n).

In order to acquire the convergence angle C(n), the CPU 2 issues a second calibration instruction to cause the user to gaze at the operation body previously issued in response to a first calibration instruction to cause the operation body to move forwards. The second calibration instruction may be an instruction to cause the user to gaze at a GUI (GUI to be operated by the user) displayed by the first calibration instruction. The first calibration instruction and the second calibration instruction may be individually issued, or one calibration instruction that doubles as the first calibration instruction and the second calibration instruction may be issued.

Figure 10A:
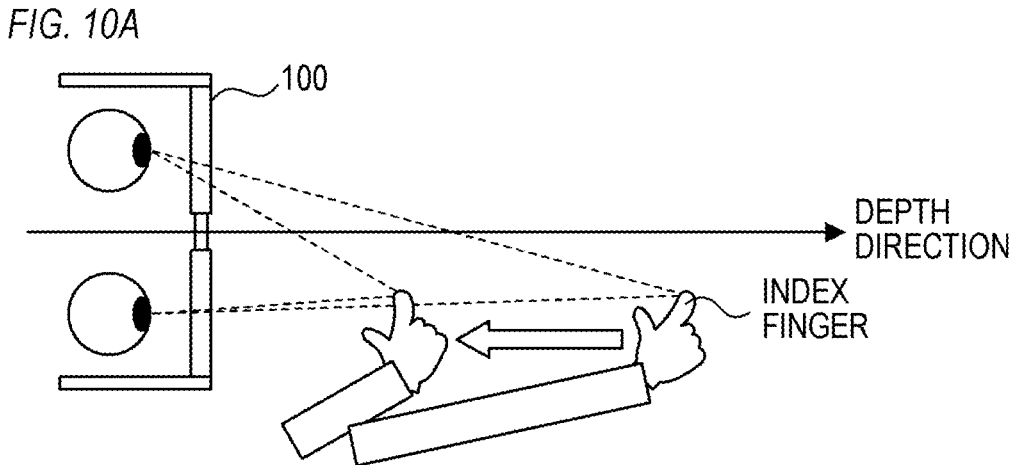
FIG. 10A is a diagram illustrating a calibration instruction.

For example, a calibration instruction to cause the user to perform an operation (action) as illustrated in FIG. 10A is issued. In FIG. 10A, the user is instructed to move the index finger forwards (to the maximum) and then slowly return the index finger right in front of the user while gazing at the stretched index finger, and performs an operation according to the instruction. During this operation, the CPU 2 repeatedly simultaneously acquires the depth distance L(n) to the index finger and the convergence angle C(n) of the user gazing at the index finger.

Figure 10B:
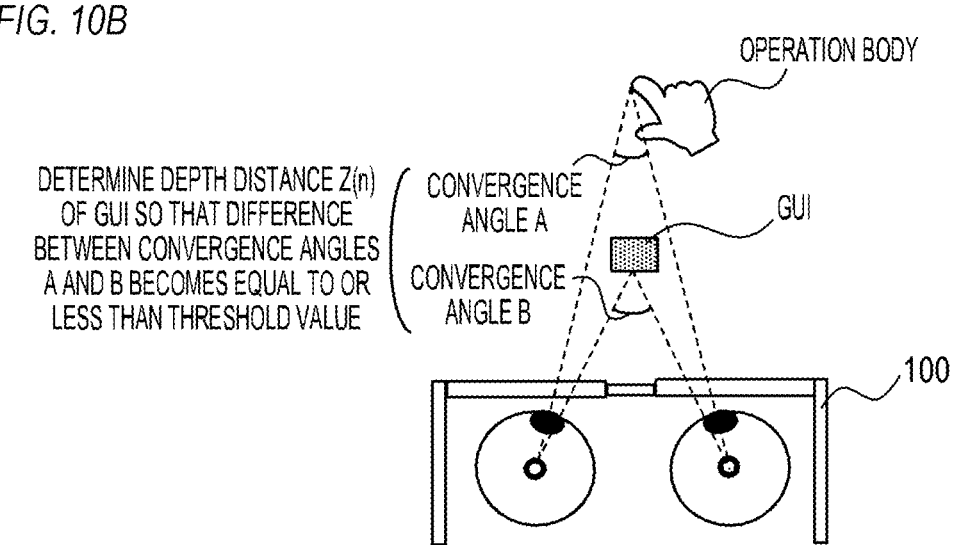
FIG. 10B is a diagram illustrating a method of determining a depth distance of a GUI.
Figure 10C:
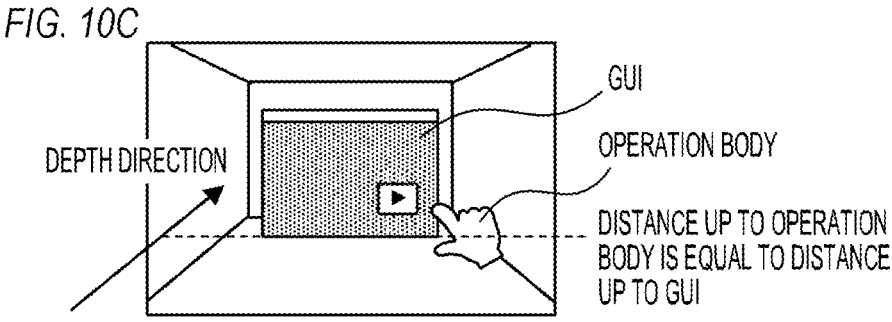
FIG. 10C is a diagram illustrating a sense of distance with respect to an operation body and the GUI.

In step S304, the CPU 2 acquires a depth distance Z(n) of the GUI corresponding to the convergence angle C(n) for each of the plurality of depth distances L(n) of the operation body. The depth distance Z(n) is a depth distance obtained by adjusting the depth distance of the GUI determined by the method of the first embodiment (the depth distance of the GUI determined on the basis of the depth distance L(n) of the operation body) on the basis of the convergence angle C(n). The depth distance may be read as a depth position. For example, the CPU 2 determines the depth distance Z(n) of the GUI such that a difference between a convergence angle A (the convergence angle C(n)) of the user when viewing the operation body at the depth distance L(n) and a convergence angle B of the user when viewing the GUI is equal to or less than a threshold value. This state is illustrated in FIG. 10B. By displaying the GUI with the depth distance Z(n), it is possible to match a sense of distance to the operation body with a sense of distance to the GUI, as illustrated in FIG. 10C.

It is noted that a method of acquiring the depth distance Z(n) is not particularly limited. For example, a GUI whose position in the coordinate system of the real space (world coordinate system) is fixed or a GUI whose depth position changes with time may be displayed. Then, the user may be caused to gaze at the GUI, the convergence angle of the user may be acquired at various distances from the GUI, and the depth distance of the GUI when the convergence angle equivalent to the convergence angle C(n) is obtained may be acquired as the depth distance Z(n) (method 1). The GUI may be operated when a sense of distance equivalent to that of the operation body (depth distance L(n)) is obtained for the GUI without acquiring the convergence angle of the user who is gazing at the GUI, and the depth distance of the GUI when the GUI is operated may be acquired as the depth distance Z(n) (method 2). The depth distance Z(n) of the GUI may be calculated from the convergence angle C(n) on the basis of a predetermined visual characteristic (method 3). According to the methods 1 and 2, it is possible to determine the depth distance Z(n) more suitable for the user than method 3.

In step S305, the CPU 2 acquires a relational expression (L-Z relational expression) between the depth distance L of the operation body and the depth distance Z of the GUI on the basis of the plurality of depth distances L(n) of the operation body and the plurality of depth distances Z(n) of the GUI. The number of the depth distances L(n) acquired in step S302 is not particularly limited, but as the number of the depth distances L(n) increases, a highly accurate L-Z relational expression can be obtained.

In step S306, the CPU 2 acquires the maximum distance Lmax among the plurality of depth distances L(n) of the operation body.

In step S307, the CPU 2 acquires the depth distance Lsel on the basis of the plurality of depth distances L(n) of the operation body. For example, an average value or a median value of the plurality of depth distances L(n) is acquired as the depth distance Lsel.

<Description of GUI Display Processing>

Figure 11:
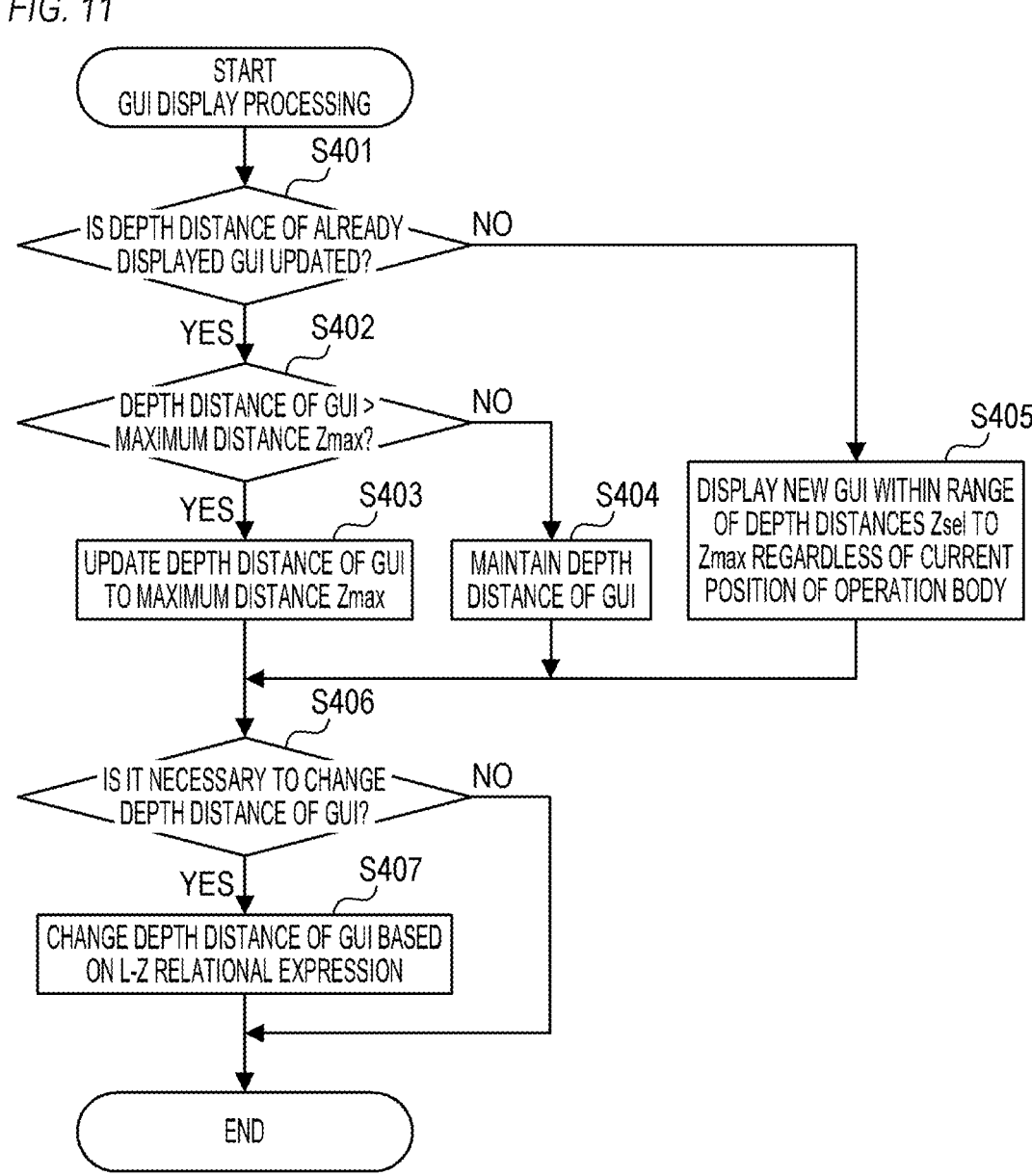
FIG. 11 is a flowchart of GUI display processing according to the second embodiment.

FIG. 11 is a flowchart of GUI display processing according to the second embodiment. The overall processing of the second embodiment is similar to the overall processing of the first embodiment (FIG. 6), and the GUI display processing in FIG. 11 is performed in step S1005 of FIG. 6.

When the GUI display processing in FIG. 11 starts, in step S401, the CPU 2 determines whether to update the depth distance of the GUI that has already been displayed. In a case where the CPU 2 determines to update the depth distance of the GUI that has already been displayed, the processing proceeds to step S402, and in a case where the CPU 2 determines not to update the depth distance (display a new GUI), the processing proceeds to step S405.

In step S402, the CPU 2 determines whether the current depth distance of the GUI is longer than a depth distance Zmax. The depth distance Zmax is a GUI depth distance corresponding to the depth distance (maximum distance) Lmax of the operation body, and is calculated using the L-Z relational expression. In a case where the CPU 2 determines that the current depth distance of the GUI is longer than the depth distance Zmax, the processing proceeds to step S403, and in a case where the CPU 2 determines that the current depth distance of the GUI is equal to or less than the depth distance Zmax, the processing proceeds to step S404.

In step S403, the CPU 2 updates the depth distance of the GUI to the depth distance Zmax (or a depth distance in the vicinity thereof).

In step S404, the CPU 2 does not update the depth distance of the GUI. In a case where the current depth distance of the GUI is shorter than a depth distance Zsel, the CPU 2 may update the depth distance of the GUI to a depth distance within a range of the depth distance Zsel or more and the depth distance Zmax or less, or a depth distance in the vicinity of the range. The depth distance Zsel is a GUI depth distance corresponding to the depth distance Lsel of the operation body, and is calculated using the L-Z relational expression.

In step S405, regardless of the current position of the operation body, the CPU 2 displays a new GUI at a depth distance within a range of the depth distance Zsel or more and the depth distance (maximum distance) Zmax or less, or a depth distance in the vicinity of the range. Since a new GUI is displayed according to an instruction from the user, the new GUI is preferably displayed at the depth distance Zsel or a depth distance in the vicinity thereof. In the operation calibration processing, only one of the depth distance Lmax and the depth distance Lsel of the operation body may be acquired, and only one of the depth distance Zmax and the depth distance Zsel of the GUI may be acquired. Then, in step S405, a new GUI may be displayed at the depth distance (the depth distance Zmax or the depth distance Zsel) acquired by the operation calibration processing or the depth distance in the vicinity thereof. The depth distance of the GUI may be selectable by the user.

In step S405, the CPU 2 may calculate a depth distance Z of the GUI corresponding to the current depth distance L of the operation body using the L-Z relational expression, and may display the GUI with the calculated depth distance Z. As a result, the GUI is displayed in the vicinity of the operation body, and the operation on the GUI can be started in a short time (improvement of operability and suppression of operation delay).

The CPU 2 can acquire the current depth distance L of the operation body using the outside world imaging unit 20, the distance detection circuit 201, and the operation body detection circuit 202. It is noted that the CPU 2 can also acquire the current depth distance L of the operation body without using the outside world imaging unit 20, the distance detection circuit 201, and the operation body detection circuit 202. For example, the CPU 2 acquires a relational expression (L-C relational expression) between the depth distance L and the convergence angle C on the basis of the plurality of depth distances L(n) and the plurality of convergence angles C(n) obtained in the operation calibration processing, performs the line-of-sight detection processing, and acquires the current convergence angle C of the user. Then, the CPU 2 calculates the depth distance L corresponding to the current convergence angle C using the L-C relational expression. If the user is gazing at the operation body, the current depth distance L of the operation body can be calculated. By not using the outside world imaging unit 20, the distance detection circuit 201, and the operation body detection circuit 202 (by not performing distance measurement), it is possible to reduce a processing load and power consumption.

In step S406, the CPU 2 determines whether it is necessary to change (update) the depth distance of the GUI. For example, in a case where the user moves, the CPU 2 determines that it is necessary to change the depth distance of the GUI in order to change the depth distance of the GUI in accordance with the movement of the user. The CPU 2 also determines that it is necessary to change the depth distance of the GUI in a case where the user performs a gesture operation of moving the GUI (for example, in a case where the user performs a gesture operation of holding the GUI by hand and moving the GUI). In a case where it is determined that it is necessary to change the depth distance of the GUI, the CPU 2 advances the processing to step S407, and in a case where it is determined that it is not necessary to change the depth distance of the GUI, the CPU 2 ends the GUI display processing in FIG. 11.

In step S407, the CPU 2 changes the depth distance of the GUI on the basis of the L-Z relational expression. It is assumed that the GUI before the change is displayed with the depth distance Z=Za corresponding to the depth distance L=La. For example, in a case where the user moves and the interval between the user and the GUI changes by a change amount $\Delta L$, the CPU 2 calculates the depth distance Z=Zb corresponding to the depth distance L=La+$\Delta L$ using the L-Z relational expression, and changes the depth distance of the GUI from the depth distance Za to the depth distance Zb. In a case where the user approaches the GUI, the change amount $\Delta L$ becomes a negative value, and in a case where the user moves away from the GUI, the change amount $\Delta L$ becomes a positive value. The change amount $\Delta L$ can be calculated on the basis of, for example, an output signal of an acceleration sensor included in the head orientation detection circuit 21.

In a case where the user performs a gesture operation of holding and moving the GUI with the hand, for example, the CPU 2 acquires the depth distance L=Lb of the hand of the user at a timing when the user performs a gesture operation of releasing the GUI from the hand. Then, the CPU 2 calculates the depth distance Z=Zb corresponding to the depth distance L=Lb using the L-Z relational expression, and changes the depth distance of the GUI from the depth distance Za to the depth distance Zb.

<Summary>

As described above, according to the second embodiment, the information on the depth position of the operation body and the information on the convergence angle of the user are acquired in advance in a state in which the user puts the operation body forwards and gazes at the operation body, and the depth position of the GUI is determined on the basis of the acquired information. This makes it possible to display the GUI at a more suitable depth position than in the first embodiment. For example, the sense of distance with respect to the operation body and the sense of distance with respect to the GUI can match each other, and the operability of the gesture operation with respect to the GUI can be further improved.

It is noted that, as in the first embodiment, the result of the operation calibration processing (depth distances Lmax, Lsel, L(n), and Z(n), convergence angle C(n), and L-Z relational expression) may be stored in the memory unit 3 and may be used again in the next or subsequent GUI display processing. The processing result (the result of the operation calibration processing) stored in the memory unit 3 may be updated as appropriate. The depth distances Zmax and Zsel may be determined in the operation calibration processing.

The user may select whether to perform the operation calibration processing of the first embodiment (FIG. 7) or the operation calibration processing of the second embodiment (FIG. 9). The operation calibration processing of the first embodiment (FIG. 7) can be performed in a shorter time than the operation calibration processing of the second embodiment (FIG. 9). In a case where the operation calibration processing of the second embodiment (FIG. 9) is performed, the GUI can be displayed at a more suitable depth position as compared with a case in which the operation calibration processing of the first embodiment (FIG. 7) is performed. After the operation calibration processing of the first embodiment (FIG. 7) is performed, the operation calibration processing of the second embodiment (FIG. 9) may be performed as necessary.

Third Embodiment

A third embodiment of the present invention will be described. Hereinafter, the description of the same points as those of the first embodiment (for example, the same configuration and processing as those of the first embodiment) will be omitted, and points different from those of the first embodiment will be described. In the first embodiment, an example of performing the operation calibration processing has been described. In the third embodiment, an example will be described in which automatic parameter update processing (processing of automatically acquiring and updating an index (parameter) for determining a depth position of a GUI) is performed under a background during normal use of the display apparatus 100 without performing operation calibration processing.

In the operation calibration processing, since the user performs an operation (action) according to a calibration instruction, a more suitable parameter can be obtained as compared with the automatic parameter update processing. However, the display apparatus 100 cannot be normally used during the operation calibration processing. By not performing the operation calibration processing, the user can start normal use of display apparatus 100 in a short time. In addition, even if the automatic parameter update processing is performed, there is no trouble that the user performs an operation according to an instruction. Therefore, it is preferable that the user can select whether to perform the operation calibration processing and whether to perform the automatic parameter update processing.

<Description of Overall Processing>

Figure 12:
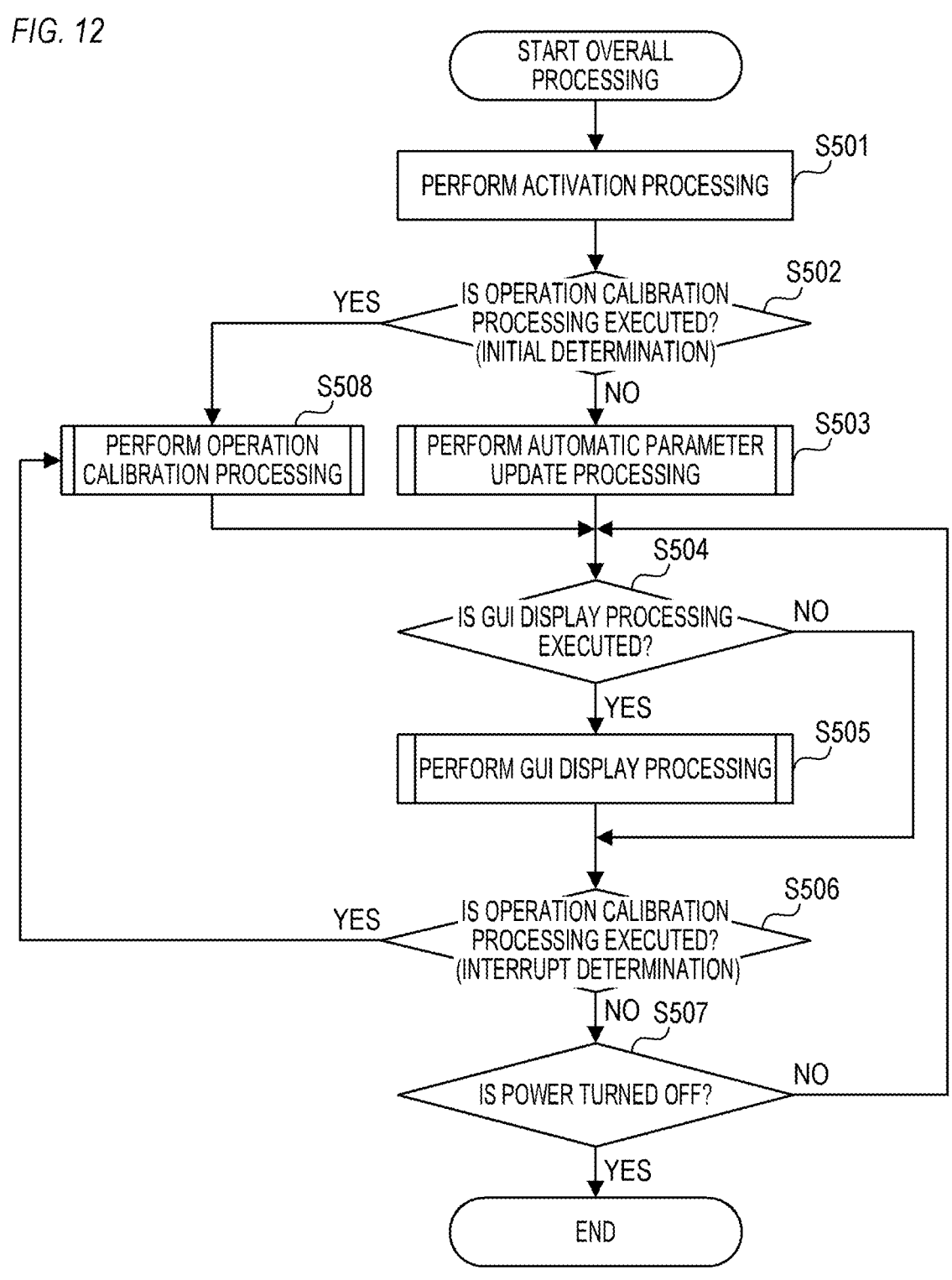
FIG. 12 is a flowchart of overall processing according to a third embodiment.

FIG. 12 is a flowchart of overall processing according to a third embodiment. For example, when a user wears the display apparatus 100 and activates the display apparatus 100, overall processing in FIG. 12 is started.

When the overall processing in FIG. 12 is started, in step S501, the CPU 2 performs activation processing similarly to step S1001 of the first embodiment (FIG. 6). In the activation processing, for example, initial setting of various parameters is performed.

In step S502, the CPU 2 determines whether to perform the operation calibration processing as in step S1002 of the first embodiment (FIG. 6). In a case where it is determined that the operation calibration processing is to be performed, the CPU 2 advances the processing to step S508, and in a case where it is determined that the operation calibration processing is not to be performed, the CPU 2 advances the processing to step S503. For example, the CPU 2 inquires of the user whether to perform the operation calibration processing. Whether to perform the operation calibration processing at the time of activation of the display apparatus 100 may be set in advance according to an instruction from the user. In a case where the current user is specified by personal authentication and a processing result (result of the operation calibration processing) for the current user has already been stored in the memory unit 3, the CPU 2 may determine not to perform the operation calibration processing. In this case, the processing result (the result of the operation calibration processing for the current user) stored in the memory unit 3 may be used in step S505.

In step S508, the CPU 2 performs operation calibration processing similarly to step S1003 of the first embodiment (FIG. 6).

In step S503, the CPU 2 performs the automatic parameter update processing. In the automatic parameter update processing, information on the physical characteristics (for example, length of the arm) of the user is automatically acquired and updated as an index (parameter) for determining the depth position of the GUI. Details of the automatic parameter update processing will be described later with reference to FIGS. 13A and 13B.

In step S504, the CPU 2 determines whether there is an instruction to execute the GUI display processing from the user, similarly to step S1004 of the first embodiment (FIG. 6). In a case where it is determined that there is the instruction to execute the GUI display processing, the CPU 2 advances the processing to step S505, and in a case where it is determined that there is no instruction to execute the GUI display processing, the CPU 2 advances the processing to step S506.

In step S505, the CPU 2 performs GUI display processing. In the GUI display processing, the depth position (depth distance) of the GUI is determined on the basis of the parameter acquired by the operation calibration processing in step S508 or the automatic parameter update processing in step S503. The GUI display processing in step S505 will be described later in detail with reference to FIG. 14.

In step S506, the CPU 2 determines whether to perform the operation calibration processing. In a case where it is determined that the operation calibration processing is to be performed, the CPU 2 advances the processing to step S508, and in a case where it is determined that the operation calibration processing is not to be performed, the CPU 2 advances the processing to step S507. The determination in step S502 is an initial determination, and the determination in step S506 is an interrupt determination. In step S506, for example, the CPU 2 determines to perform the operation calibration processing in a case where there is an instruction to perform the operation calibration processing from the user. For example, the user can issue an instruction to execute the operation calibration processing by operating a menu screen. The CPU 2 may inquire of the user whether to perform the operation calibration processing in a case where it is determined that the user is taking time to perform the gesture operation on the GUI by analyzing motion of the operation body. The CPU 2 may determine to perform the operation calibration processing without making an inquiry. A case in which the user takes time to perform the gesture operation on the GUI can be regarded as a case in which operability of the gesture operation on the GUI deteriorates, or can be regarded as a case in which the GUI is not displayed at a suitable depth position. When performing the operation calibration processing, the CPU 2 may disable the execution of the automatic parameter update processing in step S503 and may perform the GUI display processing of the first embodiment (step S1005 in FIG. 6) as the GUI display processing in step S505.

In step S507, the CPU 2 determines whether the user has instructed the display apparatus 100 to turn off the power. The CPU 2 returns the processing to step S503 in a case where it is determined that an instruction on the power OFF is not given, and ends overall processing in FIG. 12 and turns off the power of the display apparatus 100 in a case where it is determined that the instruction on the power OFF is given.

<Description of Automatic Parameter Update Processing>

Figures 13A, 13B:
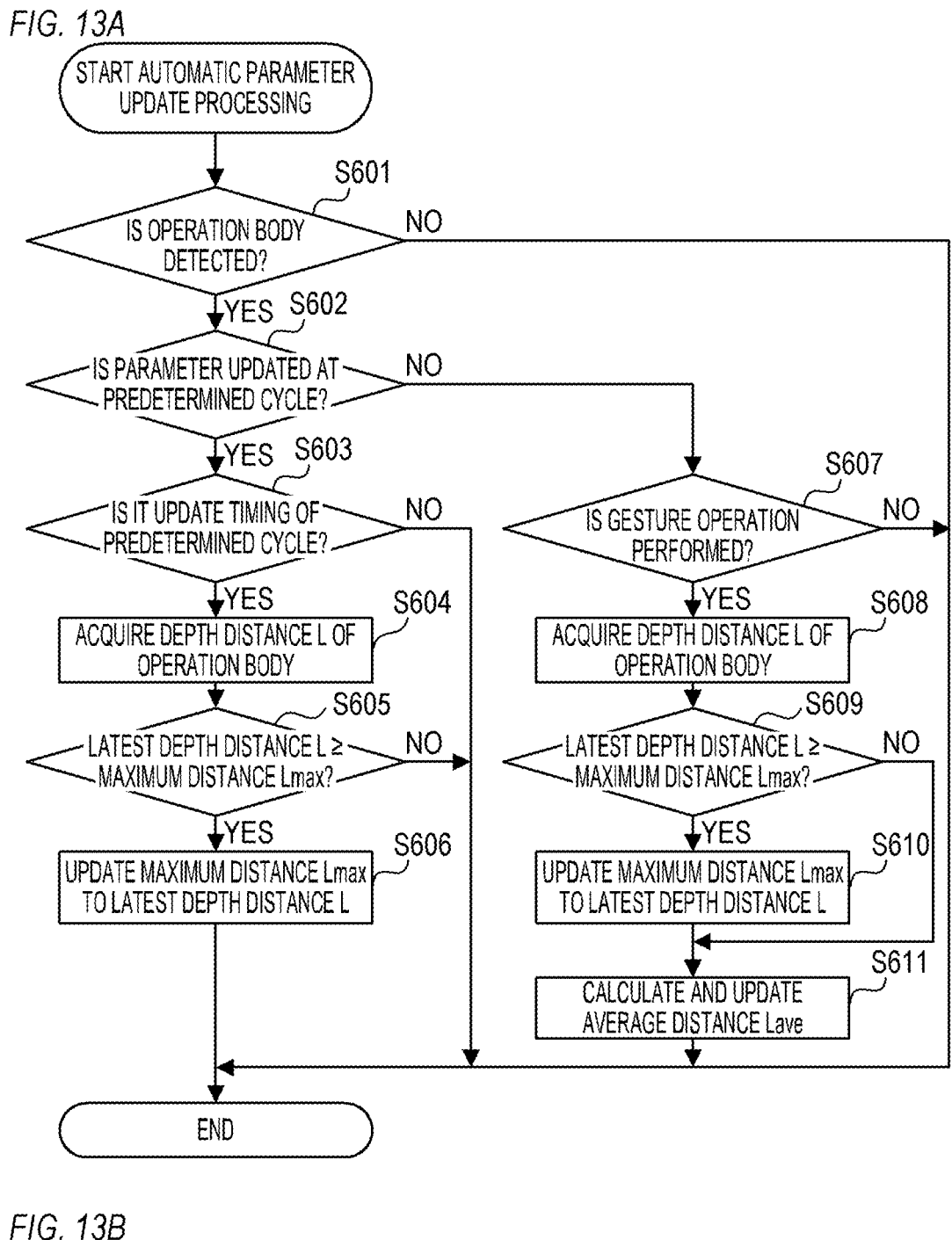
FIG. 13A is a flowchart of automatic parameter update processing according to the third embodiment.
FIG. 13B is a diagram illustrating a way of changing a distance between a user and a GUI.

FIG. 13A is a flowchart of the automatic parameter update processing performed in step S503 of FIG. 12.

When the automatic parameter update processing in FIG. 13A is started, in step S601, the CPU 2 determines whether an operation body is detected by the operation body detection circuit 202. In a case where it is determined that the operation body is detected, the CPU 2 advances the processing to step S602, and in a case where it is determined that the operation body is not detected, the CPU 2 ends the automatic parameter update processing in FIG. 13A.

In step S602, the CPU 2 determines whether a setting for updating the parameter at a predetermined cycle is valid (the setting is selected). In the third embodiment, it is assumed that a user selects a setting for updating a parameter at a predetermined cycle or a setting for updating a parameter according to a specific operation (action) by the user as a setting of the automatic parameter update processing. The specific operation is not an operation intended to update the parameter, but is, for example, a gesture operation for the GUI. In a case where the CPU 2 determines that the setting for updating the parameter at a predetermined cycle is valid, the processing proceeds to step S603, and otherwise (in a case where the CPU 2 determines that the setting for updating the parameter according to a specific operation is valid), the processing proceeds to step S607.

In step S603, the CPU 2 determines whether the current timing is an update timing of the predetermined cycle. In a case where the CPU 2 determines that the current timing is the update timing of the predetermined cycle, the processing proceeds to step S604, and in a case where the CPU 2 determines that the current timing is not the update timing of the predetermined cycle, the automatic parameter update processing in FIG. 13A ends.

In step S604, the CPU 2 acquires the depth distance L of the operation body using the outside world imaging unit 20, the distance detection circuit 201, and the operation body detection circuit 202. In the third embodiment, the automatic parameter update processing in FIG. 13A (the automatic parameter update processing in step S503 of FIG. 12) can be repeatedly performed. Therefore, the depth distance L of the operation body can be repeatedly acquired.

In step S605, the CPU 2 determines whether the latest depth distance L acquired in step S604 is longer than the maximum distance Lmax (past depth distance L) included in the parameters for determining the depth position of the GUI. In a case where the CPU 2 determines that the latest depth distance L is longer than the maximum distance Lmax, the processing proceeds to step S606, and in a case where the CPU 2 determines that the latest depth distance L is equal to or less than the maximum distance Lmax, the automatic parameter update processing in FIG. 13A ends. The determination in step S605 can also be regarded as a determination as to whether the depth position corresponding to (related to) the latest depth distance L is deeper than the depth position corresponding to the maximum distance Lmax (past depth distance L).

In step S606, the CPU 2 updates the maximum distance Lmax from the previous depth distance L to the latest depth distance L acquired in step S604.

According to the processing in steps S603 to S606, the depth distance L of the operation body is acquired at a predetermined cycle, and the parameter (maximum distance Lmax) is updated on the basis of the acquired depth distance L. Since there is no need to determine whether the user has performed a specific operation (action), the parameter can be updated with a small processing load.

In step S607, the CPU 2 determines whether the user has performed (is performing) the gesture operation on the GUI. This determination can also be regarded as a determination as to whether the CPU 2 has received (is receiving) an operation command generated in response to the gesture operation on the GUI. In a case where it is determined that the user has performed the gesture operation on the GUI, the CPU 2 advances the processing to step S608, and in a case where it is determined that the user has not performed the gesture operation on the GUI, the CPU 2 ends the automatic parameter update processing in FIG. 13A. In step S607, the CPU 2 may determine whether a specific gesture operation has been performed among a plurality of gesture operations that can be performed on the GUI by the user. The CPU 2 may determine whether a condition that the user performs a gesture operation on the GUI and gazes at the GUI is satisfied.

In step S608, the CPU 2 acquires the depth distance L of the operation body using the outside world imaging unit 20, the distance detection circuit 201, and the operation body detection circuit 202.

In step S609, the CPU 2 determines whether the latest depth distance L acquired in step S608 is longer than the maximum distance Lmax (past depth distance L) included in the parameters for determining the depth position of the GUI. In a case where the CPU 2 determines that the latest depth distance L is longer than the maximum distance Lmax, the processing proceeds to step S610, and in a case where the CPU 2 determines that the latest depth distance L is equal to or less than the maximum distance Lmax, the processing proceeds to step S611.

In step S610, the CPU 2 updates the maximum distance Lmax to the latest depth distance L acquired in step S608.

In step S611, the CPU 2 calculates, as an average distance Lave, an average of the plurality of depth distances L including the latest depth distance L acquired when the gesture operation is performed on the GUI. The average distance Lave can also be regarded as average information related to an average of a plurality of depth positions respectively corresponding (related) to the plurality of depth distances L. In the third embodiment, the parameter for determining the depth position of the GUI includes the average distance Lave. The CPU 2 updates the average distance Lave included in the parameter from the past average distance Lave (the average of the plurality of depth distances L obtained in the past) to the current average distance (the average of the plurality of depth distances L including the latest depth distance L). It is noted that the average distance Lave may be an average of all the depth distances L acquired when a gesture operation is performed on the GUI, or may be an average of a predetermined number of depth distances L from the new depth distance L. The average distance Lave may be an average of a plurality of depth distances L corresponding to one gesture operation or an average of a plurality of depth distances L corresponding to a plurality of gesture operations.

As illustrated in FIG. 13B, the user can change a distance (GUI depth distance) between the user and the GUI by moving the user himself/herself or moving the GUI by the gesture operation. For example, the user changes the position of the GUI so that the GUI is displayed at a position that is easy to operate or a position that is not obstructive. Therefore, the average distance Lave can be regarded as the depth distance of the operation body that makes it easy for the user to operate the GUI.

According to the processing in steps S603 to S606, since the depth distance L is acquired when the gesture operation is performed on the GUI, it is possible to suppress acquisition of the useless depth distance. Furthermore, it is possible to acquire the average distance Lave that can be regarded as the depth distance of the operation body at which the user can easily operate the GUI.

<GUI Display Processing>

Figure 14:
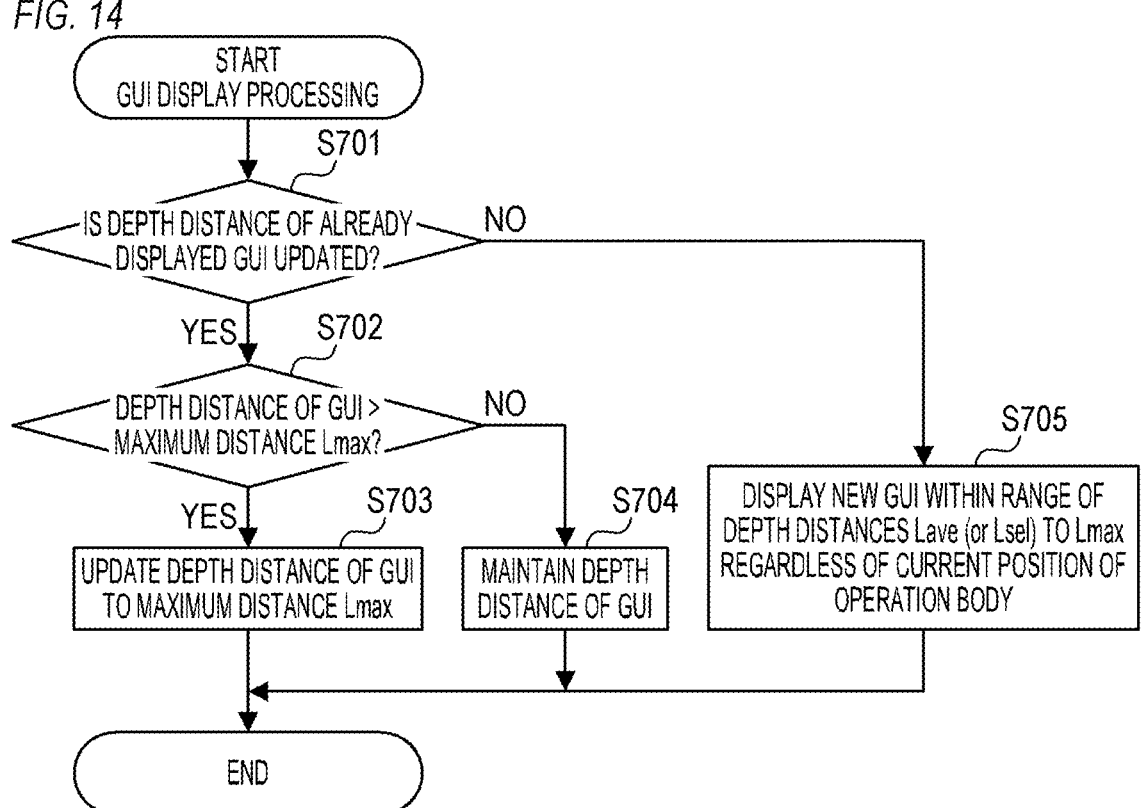
FIG. 14 is a flowchart of GUI display processing according to the third embodiment.

FIG. 14 is a flowchart of GUI display processing performed in step S505 of FIG. 12.

When the GUI display processing in FIG. 14 starts, in step S701, the CPU 2 determines whether to update the depth distance of the GUI that has already been displayed. In a case where the CPU 2 determines to update the depth distance of the GUI that has already been displayed, the processing proceeds to step S702, and in a case where the CPU 2 determines not to update the depth distance (display a new GUI), the processing proceeds to step S705.

In step S702, the CPU 2 determines whether a current depth distance of the GUI is longer than the depth distance (maximum distance) Lmax. In a case where the CPU 2 determines that the current depth distance of the GUI is longer than the depth distance Lmax, the processing proceeds to step S703, and in a case where the CPU 2 determines that the current depth distance of the GUI is equal to or less than the depth distance Lmax, the processing proceeds to step S704.

In step S703, the CPU 2 updates the depth distance of the GUI to the depth distance (maximum distance) Lmax (or a depth distance in the vicinity thereof).

In step S704, the CPU 2 does not update the depth distance of the GUI. In a case where the current depth distance of the GUI is shorter than the depth distance Lave (or Lsel), the depth distance of the GUI may be updated to a depth distance within a range of the depth distance Lave (or Lsel) or more and the depth distance Lmax or less, or a depth distance in the vicinity of the range. The depth distance Lsel is acquired by the operation calibration processing performed in step S508 of FIG. 12.

In step S705, regardless of the current position of the operation body, the CPU 2 displays a new GUI at a depth distance within a range of the depth distance (average distance) Lave (or the depth distance Lsel) or more and the depth distance (maximum distance) Lmax or less, or a depth distance in the vicinity of the range. Since a new GUI is displayed in response to an instruction from the user, it is preferable that the new GUI is displayed at the depth distance (average distance) Lave, the depth distance Lsel, or a depth distance in the vicinity thereof. The depth distance of the GUI may be selectable by the user. In the automatic parameter update processing, the depth distance Lave may not be acquired.

According to the GUI display processing in FIG. 14, when the depth distances Lmax, Lsel, and Lave change, the depth distance of the GUI also changes. It is assumed that the depth distance Lave is updated when the gesture operation is performed on the GUI, and the GUI is displayed with the depth distance Lave. In this case, in a case where the gesture operation is performed on the GUI, the depth position of the GUI is different between a case in which the depth position of the operation body is a first position and a case in which the depth position of the operation body is a second position different from the first position.

<Summary>

As described above, according to the third embodiment, the information on the depth position of the operation body is repeatedly and automatically acquired, and the parameter for determining the depth position of the GUI is determined on the basis of a plurality of pieces of information up to the latest information (a plurality of pieces of information on the depth position of the operation body). As a result, it is possible to obtain the same effect as those of the first embodiment without performing the operation calibration processing. Further, the user can start normal use of the display apparatus in a short time.

Fourth Embodiment

A fourth embodiment of the present invention will be described. It is noted that, hereinafter, the description of the same points as those of the third embodiment (for example, the same configuration and processing as those of the third embodiment) will be omitted, and points different from those of the third embodiment will be described. Therefore, in the fourth embodiment, the GUI is displayed at a more suitable depth position for the current user by further considering the visual characteristics of the current user in addition to the physical characteristics of the current user.

The overall processing of the second embodiment is similar to the overall processing of the third embodiment (FIG. 12). However, as the operation calibration processing in step S508, the same processing as the operation calibration processing in the second embodiment (FIG. 9) is performed. As the GUI display processing in step S505, the same processing as the GUI display processing in the second embodiment (FIG. 11) is performed. Then, as the automatic parameter update processing in step S503, the automatic parameter update processing (automatic update processing of physical characteristics) of the third embodiment (FIG. 14) and automatic parameter update processing (automatic update processing of visual characteristics) to be described later are performed. In the GUI display processing (steps S404 and S405 in FIG. 11), a depth distance Zave may be used instead of the depth distance Zsel. The depth distance Zave is a depth distance of the GUI corresponding to the depth distance (average distance) Lave of the operation body, and is calculated using the L-Z relational expression. The automatic update processing of the physical characteristics and the automatic update processing of the visual characteristics may be performed individually, or may be performed as one automatic parameter update processing including the automatic update processing of the physical characteristics and the automatic update processing of the visual characteristics.

<Description of Automatic Parameter Update Processing>

FIG. 15A is a flowchart of automatic parameter update processing according to a fourth embodiment.

In step S801, the CPU 2 determines whether a setting for updating the parameter at a predetermined cycle is valid (the setting is selected). In the fourth embodiment, it is assumed that a user selects a setting for updating a parameter at a predetermined cycle or a setting for updating a parameter in accordance with gaze of an object (operation body or GUI) as a setting of the automatic parameter update processing (automatic update processing of visual characteristics) in FIG. 15A. In a case where the CPU 2 determines that the setting for updating the parameter at a predetermined cycle is valid, the processing proceeds to step S802, and otherwise (in a case where the CPU 2 determines that the setting for updating the parameter according to the gaze of an object is valid), the processing proceeds to step S803.

In step S802, the CPU 2 determines whether the current timing is an update timing of the predetermined cycle. In a case where the CPU 2 determines that the current timing is the update timing of the predetermined cycle, the processing proceeds to step S803, and in a case where the CPU 2 determines that the current timing is not the update timing of the predetermined cycle, the automatic parameter update processing in FIG. 15A ends.

In step S803, the CPU 2 determines gaze by the user. In a case where it is determined that the user is gazing at the operation body, the CPU 2 advances the processing to step S804, and in a case where it is determined that the user is gazing at the GUI, the CPU 2 advances the processing to step S807. In a case where it is determined that the user is not gazing at the operation body or the GUI, the CPU 2 ends the automatic parameter update processing in FIG. 15A.

In step S804, the CPU 2 acquires the depth distance L(n) of the operation body using the outside world imaging unit 20, the distance detection circuit 201, and the operation body detection circuit 202.

In step S805, the CPU 2 acquires the convergence angle C(n) of the user (the convergence angle C(n) corresponding to the depth distance L(n) acquired in step S804) in a state in which the user is gazing at the operation body.

In step S806, the CPU 2 uses the depth distance L(n) acquired in step S804 and the convergence angle C(n) acquired in step S805 to generate (acquire) or update a relational expression (L-C relational expression) between the depth distance L of the operation body and the convergence angle C of the user. In the fourth embodiment, the automatic parameter update processing in FIG. 15A (the automatic parameter update processing in step S503 of FIG. 12) can be repeatedly performed. Therefore, the depth distance L(n) of the operation body and the convergence angle C(n) of the user can be repeatedly acquired. The CPU 2 generates the L-C relational expression using the plurality of depth distances L(n) and the plurality of convergence angles C(n).

In step S807, the CPU 2 acquires the depth distance Z(n) of the GUI gazed at by the user.

In step S808, the CPU 2 acquires the convergence angle C(n) of the user (the convergence angle C(n) corresponding to the depth distance Z(n) acquired in step S807) in a state in which the user is gazing at the GUI.

In step S809, the CPU 2 uses the depth distance Z(n) acquired in step S807 and the convergence angle C(n) acquired in step S808 to generate (acquire) or update a relational expression (Z-C relational expression) between the depth distance Z of the GUI and the convergence angle C of the user. As described above, in the fourth embodiment, the automatic parameter update processing in FIG. 15A (the automatic parameter update processing in step S503 of FIG. 12) can be repeatedly performed. Therefore, the depth distance Z(n) of the GUI and the convergence angle C(n) of the user can be repeatedly acquired. The CPU 2 generates the Z-C relational expression using the plurality of depth distances Z(n) and the plurality of convergence angles C(n).

In step S810, the CPU 2 acquires a relational expression (L-Z relational expression) between the depth distance L of the operation body and the depth distance Z of the GUI on the basis of the L-C relational expression and the Z-C relational expression. In the L-Z relational expression, the depth distance Z is a depth distance obtained by adjusting the depth distance of the GUI determined by the method of the third embodiment (the depth distance of the GUI determined on the basis of the depth distance L of the operation body) on the basis of the convergence angle C of the user who is gazing at the operation body. A difference between the convergence angle of the user when viewing the operation body at the depth distance L and the convergence angle of the user when viewing the GUI at the depth distance Z corresponding to the depth distance L is equal to or less than a threshold value. By determining the depth distance of the GUI using the L-Z relational expression, it is possible to match a sense of distance to the operation body with a sense of distance to the GUI.

FIG. 15B illustrates a relationship between the depth distance L(n), the depth distance Z(n), and the convergence angle C(n). When a combination of the depth distance L(n) and the convergence angle C(n) is accumulated, the L-C relational expression is generated, and the L-C relational expression is updated every time the combination of the depth distance L(n) and the convergence angle C(n) is acquired. The Z-C relational expression is generated when a combination of the depth distance Z(n) and the convergence angle C(n) is accumulated, and the Z-C relational expression is updated every time the combination of the depth distance Z(n) and the convergence angle C(n) is acquired. When the L-C relational expression and the Z-C relational expression are generated, the L-Z relational expression is generated, and the L-Z relational expression is updated every time at least one of the L-C relational expression and the Z-C relational expression is updated.

<Summary>

As described above, in the fourth embodiment as well, the information on the depth position of the operation body, the information on the depth position of the GUI, and the information on the convergence angle of the user are repeatedly and automatically acquired. Then, a parameter for determining the depth position of the GUI is determined on the basis of the pieces of information. As a result, it is possible to obtain the same effect as those of the second embodiment without performing the operation calibration processing. Further, the user can start normal use of the display apparatus in a short time.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

According to the present invention, a GUI is displayed at a suitable depth position by an optical see-through type head mounted display apparatus (even if a user can use only one hand).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus capable of being used with an optical see-through type head mounted display apparatus, the information processing apparatus comprising one or more processors and/or circuitry configured to execute:

first instruction processing of issuing, to a user, a first instruction to cause an operation body located at a position of a hand of the user to move forwards to a predetermined distance from the head mounted display apparatus;

first acquisition processing of acquiring first information on a depth position of the operation body in a state in which the user moves the operation body forwards to the predetermined distance in response to the first instruction; and determination processing of determining, on a basis of the first information, a depth position of a GUI displayed on the head mounted display apparatus and operated by the operation body, wherein the predetermined distance is a maximum distance that the operation body is movable from the head mounted display apparatus and the depth position of the GUI is determined to be within the predetermined distance when the GUI is displayed on the head mounted display apparatus.

2. The information processing apparatus according to claim 1, wherein the first instruction includes an instruction to stretch an arm of the user.

3. The information processing apparatus according to claim 1, wherein the first instruction includes an instruction to move the operation body to a depth position at which the GUI is easily operated.

4. The information processing apparatus according to claim 1, wherein the one or more processors and/or circuitry further executes:

second instruction processing of issuing a second instruction to cause the user to gaze at the operation body moved forwards by the user in response to the first instruction; and second acquisition processing of acquiring second information on a convergence angle of the user in a state in which the user gazes at the operation body in response to the second instruction, and in the determination processing, a depth position obtained by adjusting, on a basis of the second information, the depth position of the GUI determined on a basis of the first information is determined as the depth position of the GUI.

5. An information processing apparatus capable of being used with an optical see-through type head mounted display apparatus, the information processing apparatus comprising one or more processors and/or circuitry configured to execute:

first acquisition processing of repeatedly acquiring first information on a depth position of an operation body located at a position of a hand of a user;

first determination processing of determining, on a basis of a plurality of pieces of the first information up to latest first information, a parameter indicating a predetermined distance of the operation body from the head mounted display apparatus for determining a depth position of a GUI displayed on the head mounted display apparatus and operated by the operation body; and second determination processing of determining the depth position of the GUI on a basis of the parameter, wherein the predetermined distance is a maximum distance that the operation body is movable from the head mounted display apparatus and the depth position of the GUI is determined to be within the predetermined distance when the GUI is displayed on the head mounted display apparatus.

6. The information processing apparatus according to claim 5, wherein the parameter includes the first information, and in a case where the depth position associated with the latest first information is deeper than a depth position associated with past first information included in the parameter, in the first determination processing, the first information included in the parameter is updated from the past first information to the latest first information.

7. The information processing apparatus according to claim 5, wherein the parameter includes average information on an average of a plurality of depth positions respectively associated with a plurality of pieces of first information acquired when an operation is performed on the GUI, and in a case where the GUI is operated, in the first determination processing, the average information included in the parameter is updated from average information on a past average to average information on a current average.

8. The information processing apparatus according to claim 5, wherein the one or more processors and/or circuitry further executes second acquisition processing of acquiring second information on a convergence angle of the user when the first information is acquired in a case where the user gazes at the operation body, and in the second determination processing, a depth position obtained by adjusting, on a basis of the second information, the depth position of the GUI determined on a basis of the parameter is determined as the depth position of the GUI.

9. An optical see-through type head mounted display apparatus comprising:

the information processing apparatus according to claim 1; and a display configured to display the GUI.

10. A control method of an information processing apparatus capable of being used with an optical see-through type head mounted display apparatus, the control method comprising:

issuing, to a user, a first instruction to cause an operation body located at a position of a hand of the user to move forwards to a predetermined distance from the head mounted display apparatus;

acquiring first information on a depth position of the operation body in a state in which the user moves the operation body forwards to the predetermined distance in response to the first instruction; and determining, on a basis of the first information, a depth position of a GUI displayed on the head mounted display apparatus and operated by the operation body;

wherein the predetermined distance is a maximum distance that the operation body is movable from the head mounted display apparatus and the depth position of the GUI is determined to be within the predetermined distance when the GUI is displayed on the head mounted display apparatus.

11. A non-transitory computer readable medium that stores a program, wherein the program causes a computer to execute a control method of an information processing apparatus capable of being used with an optical see-through type head mounted display apparatus, the control method comprising:

issuing, to a user, a first instruction to cause an operation body located at a position of a hand of the user to move forwards to a predetermined distance from the head mounted display apparatus;

acquiring first information on a depth position of the operation body in a state in which the user moves the operation body forwards to the predetermined distance in response to the first instruction; and determining, on a basis of the first information, a depth position of a GUI displayed on the head mounted display apparatus and operated by the operation body;

wherein the predetermined distance is a maximum distance that the operation body is movable from the head mounted display apparatus and the depth position of the GUI is determined to be within the predetermined distance when the GUI is displayed on the head mounted display apparatus.

12. The information processing apparatus according to claim 1, wherein the predetermined distance is a threshold distance of movement of the operation body from the head mounted display apparatus.

13. The information processing apparatus according to claim 1, wherein the maximum distance corresponds to a length of an arm of the user.

14. The information processing apparatus according to claim 1, wherein the determination processing includes, in a case where a current depth position of the GUI already displayed on the head mounted display apparatus is deeper than the predetermined distance, updating the depth position of the GUI to the predetermined distance.

15. The information processing apparatus according to claim 1, wherein, regardless of a current position of the operation body, a new GUI is displayed on the head mounted display apparatus at a depth position determined to be within the predetermined distance.

16. The information processing apparatus according to claim 1, wherein the predetermined distance is acquired using phase-difference auto-focus distance measurement.

17. The information processing apparatus according to claim 1, wherein the first information includes at least one of (i) a distance to a back of the hand of the user and (ii) a distance to an index finger extended by the user.

18. The information processing apparatus according to claim 1, wherein a definition of a distance corresponding to the depth position of the operation body is changed based on a type of the operation body and a type of a registered gesture.

19. The information processing apparatus according to claim 2, wherein the first instruction includes displaying an index and instructing the user to stretch the arm of the user toward the index displayed at a depth position at which the operation body does not reach.

20. The information processing apparatus according to claim 1, further comprising a memory configured to store the predetermined distance, wherein the predetermined distance stored in the memory is used in subsequently determining the depth position of the GUI.

\* \* \* \* \*